United States Patent
Kumar et al.

(10) Patent No.: US 9,571,636 B2
(45) Date of Patent: *Feb. 14, 2017

(54) CALL CENTER BUILDER PLATFORM

(71) Applicant: Angel.com Incorporated, Vienna, VA (US)

(72) Inventors: Praphul Kumar, Falls Church, VA (US); Yochai Konig, San Francisco, CA (US); Ahmed Tewfik Bouzid, McLean, VA (US); Ashish Thakkar, Brampton (CA); Leon Vymenets, Toronto (CA)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,249

(22) Filed: Dec. 31, 2014

(65) Prior Publication Data
US 2016/0191705 A1 Jun. 30, 2016

(51) Int. Cl.
H04M 3/00 (2006.01)
H04M 5/00 (2006.01)
(Continued)

(52) U.S. Cl.
CPC ..... *H04M 3/42153* (2013.01); *H04M 3/42144* (2013.01); *H04M 3/5133* (2013.01);
(Continued)

(58) Field of Classification Search
USPC ............ 379/265.01, 265.02, 265.03, 265.04, 379/265.05, 265.06, 265.07, 265.08, 379/265.09, 265.1, 265.11, 265.12, 379/265.13, 265.14, 266.01, 26, 6.02, 379/266.03, 266.04, 266.05, 266.06, 379/266.07, 266.08, 266.09, 266.1
See application file for complete search history.

(56) References Cited

U.S. PATENT DOCUMENTS 6,067,357 A * 5/2000 Kishinsky ........... H04M 3/5183
379/265.02
6,263,051 B1 7/2001 Saylor et al.
(Continued)

OTHER PUBLICATIONS

International Search Report issued Aug. 2, 2011 in International Application No. PCT/US2011/033505, 2 pages.
(Continued)

*Primary Examiner* — Khai N Nguyen
(74) *Attorney, Agent, or Firm* — Lewis Roca Rothgerber Christie LLP

(57) ABSTRACT

Instructions are transmitted from a contact center builder system to a content provider system that, when executed, provide an interface for configuring a contact center for the content provider that includes a contact center telephone number, an agent pool, and an interaction site. Data associated with one or more contact center configuration parameters are received from the content provider. A contact center telephone number is assigned to the contact center based on the data. One or more agents are assigned to the agent pool of the contact center based on the data. The data includes a task to be handled by the communications system without using an agent of the agent pool is determined. In response to determining that the data includes the task to be handled by the communications system without using an agent of the agent pool, multiple interaction pages for the interaction site are generated.

20 Claims, 18 Drawing Sheets

(51) Int. Cl.
*H04M 3/42* (2006.01)
*H04M 3/51* (2006.01)
*H04M 3/493* (2006.01)

(52) U.S. Cl.
CPC .......... *H04M 3/5166* (2013.01); *H04M 3/493* (2013.01); *H04M 3/4933* (2013.01)

(56) References Cited

U.S. PATENT DOCUMENTS

| | | | |
|---|---|---|---|
| 6,587,547 B1 | 7/2003 | Zirngibl et al. | |
| 6,606,596 B1 | 8/2003 | Zirngibl et al. | |
| 6,658,093 B1 | 12/2003 | Langseth et al. | |
| 6,763,104 B1 * | 7/2004 | Judkins | H04M 3/5233 |
| | | | 379/265.09 |
| 6,765,997 B1 | 7/2004 | Zirngibl et al. | |
| 6,768,788 B1 | 7/2004 | Langseth et al. | |
| 6,788,768 B1 | 9/2004 | Saylor et al. | |
| 6,798,867 B1 | 9/2004 | Zirngibl et al. | |
| 6,829,334 B1 | 12/2004 | Zirngibl et al. | |
| 6,836,537 B1 | 12/2004 | Zirngibl et al. | |
| 6,850,603 B1 | 2/2005 | Eberle et al. | |
| 6,873,693 B1 | 3/2005 | Langseth et al. | |
| 6,885,734 B1 | 4/2005 | Eberle et al. | |
| 6,895,084 B1 | 5/2005 | Saylor et al. | |
| 6,940,953 B1 | 9/2005 | Eberle et al. | |
| 6,964,012 B1 | 11/2005 | Zirngibl et al. | |
| 6,977,992 B2 | 12/2005 | Zirngibl et al. | |
| 7,020,251 B2 | 3/2006 | Zirngibl et al. | |
| 7,082,422 B1 | 7/2006 | Zirngibl et al. | |
| 7,197,461 B1 | 3/2007 | Eberle et al. | |
| 7,266,181 B1 | 9/2007 | Zirngibl et al. | |
| 7,272,212 B2 | 9/2007 | Eberle et al. | |
| 7,296,226 B2 | 11/2007 | Junkermann | |
| 7,340,040 B1 | 3/2008 | Saylor et al. | |
| 7,428,302 B2 | 9/2008 | Zirngibl et al. | |
| 7,440,898 B1 | 10/2008 | Eberle et al. | |
| 7,457,397 B1 | 11/2008 | Saylor et al. | |
| 7,486,780 B2 | 2/2009 | Zirngibl et al. | |
| 7,487,094 B1 | 2/2009 | Konig et al. | |
| 7,831,693 B2 | 11/2010 | Lai | |
| 8,018,921 B2 | 9/2011 | Pogossiants et al. | |
| 8,041,575 B2 | 10/2011 | Agarwal et al. | |
| 8,117,538 B2 | 2/2012 | Anisimov et al. | |
| 8,200,527 B1 | 6/2012 | Thompson et al. | |
| 8,369,509 B2 * | 2/2013 | Jennings | H04M 3/5232 |
| | | | 379/265.02 |
| 8,571,195 B2 * | 10/2013 | Pasi | H04M 3/523 |
| | | | 379/205.01 |
| 8,654,934 B2 | 2/2014 | Saylor et al. | |
| 8,917,828 B2 | 12/2014 | Bouzid et al. | |
| 2002/0175943 A1 * | 11/2002 | Hunt | G06F 3/0481 |
| | | | 715/771 |
| 2003/0144843 A1 | 7/2003 | Belrose | |
| 2003/0231758 A1 * | 12/2003 | Bock | H04M 3/523 |
| | | | 379/265.02 |
| 2004/0117804 A1 | 6/2004 | Scahill et al. | |
| 2005/0065837 A1 * | 3/2005 | Kosiba | G06Q 10/04 |
| | | | 705/7.13 |
| 2005/0141679 A1 | 6/2005 | Zirngibl et al. | |
| 2005/0273759 A1 | 12/2005 | Lucassen et al. | |
| 2006/0109975 A1 * | 5/2006 | Judkins | H04M 3/5233 |
| | | | 379/265.02 |
| 2007/0250841 A1 | 10/2007 | Scahill et al. | |
| 2007/0286162 A1 | 12/2007 | Fabbrizio et al. | |
| 2008/0065390 A1 | 3/2008 | Ativanichayaphong et al. | |
| 2009/0138269 A1 | 5/2009 | Agarwal et al. | |
| 2009/0204603 A1 | 8/2009 | Martino et al. | |
| 2011/0196979 A1 | 8/2011 | Maes | |
| 2011/0286586 A1 | 11/2011 | Saylor et al. | |
| 2011/0293078 A1 * | 12/2011 | Saylor | H04M 3/493 |
| | | | 379/88.13 |
| 2012/0084751 A1 * | 4/2012 | Makagon | G06F 8/71 |
| | | | 717/121 |
| 2012/0173386 A1 * | 7/2012 | Moon | G06F 17/3089 |
| | | | 705/26.81 |
| 2012/0300921 A1 * | 11/2012 | Jennings | H04M 3/5232 |
| | | | 379/265.12 |
| 2013/0028396 A1 * | 1/2013 | Pasi | H04M 3/523 |
| | | | 379/67.1 |
| 2014/0177821 A1 * | 6/2014 | Ristock | G06Q 10/0631 |
| | | | 379/266.08 |
| 2014/0188475 A1 | 7/2014 | Lev-Tov | |
| 2014/0348319 A1 | 11/2014 | Bouzid et al. | |
| 2015/0248226 A1 * | 9/2015 | Kumar | G06F 3/04847 |
| | | | 715/747 |

OTHER PUBLICATIONS

Written Opinion of the International Searching Authority issued Aug. 2, 2011 in International Application No. PCT/US2011/033505, 9 pages.
PCT Notification Concerning Transmittal of International Preliminary Report on Patentability for Application No. PCT/US2011/033505 dated Oct. 23, 2012, 11 pages.
U.S. Non-Final Office Action for U.S. Appl. No. 13/092,090 dated May 9, 2013, 12 pages.
U.S. Non-Final Office Action for U.S. Appl. No. 13/092,101 dated Mar. 11, 2013, 12 pages.
U.S. Notice of Allowance for U.S. Appl. No. 13/092,101 dated Jul. 12, 2013, 11 pages.
U.S. Notice of Allowance for U.S. Appl. No. 13/092,090 dated Oct. 9, 2013, 13 pages.
U.S. Notice of Allowance for U.S. Appl. No. 14/032,443 dated Jul. 22, 2014, 13 pages.
U.S. Non-Final Office Action for U.S. Appl. No. 14/058,661 dated Sep. 4, 2014, 13 pages.
U.S. Notice of Allowance for U.S. Appl. No. 14/170,722 dated Oct. 27, 2014, 19 pages.
PCT Notification of Transmittal of the International Search Report and the Written Opinion for Application No. PCT/US2014/056452 dated Dec. 29, 2014, 14 pages.
Bellman, "Dynamic programming," Princeton University Press, 1957, pp. 169-199.
Brown et al., "Class-based n-gram models of natural language," J Computational Linguistics, 1992, 18(4):467-479.

* cited by examiner

CALL CENTER BUILDER PLATFORM

TECHNICAL FIELD

The following disclosure relates generally to the development and execution of a multi-channel interaction application.

BACKGROUND

A content provider may set up a contact center having an application that allows a user to use a personal communications device to contact a company to discuss a service or a product provided by the company. Content providers may set up and/or maintain contact centers over a contact center builder platform.

SUMMARY

In a general aspect, instructions that, when executed, provide a graphic user interface for configuring a contact center for the content provider. The contact center includes a contact center telephone number, an agent pool, and an interaction site. The interaction site enables communications between a user device and a communications system over any of multiple communications channels, including an interactive voice response (IVR) channel. The interaction site specifies a multi-step communication flow between the user device and the communications system. The multi-step communication flow is determined based on multiple interaction pages configurable by a developer of the content provider system. Data associated with one or more contact center configuration parameters is received at the contact center builder system from the content provider system. The contact center telephone number is assigned to the contact center based on the data. One or more agents are assigned to the agent pool of the contact center based on the data. The data includes a task to be handled by the communications system without using an agent of the agent pool is determined. In response to determining that the data includes the task to be handled by the communications system without using an agent of the agent pool, multiple interaction pages for the interaction site are generated, where at least one interaction page of the multiple interaction pages enables a caller of a user device to communicate with the communications system to reach an agent of the agent pool, and where at least one other interaction page of the multiple interaction pages enables a caller of a user device to communicate with the communications system to complete the task using the IVR channel without using an agent of the agent pool.

Implementations may include one or more of the following features. For example, to assign the contact center telephone number to the contact center, one or more candidate telephone numbers may be selected from multiple telephone numbers provided by multiple telephone carriers. Instructions that, when executed, provide an interface for selecting one of the one or more candidate telephone numbers may be transmitted, from the contact center builder system to the content provider system. Data representing a selection of a particular telephone number of the one or more candidate telephone numbers may be received, from the content provider system to the contact center builder system. In response to receiving the data representing the selection of the particular telephone number, the particular telephone number may be assigned to the contact center as the contact center telephone number.

To assign one or more agents to the agent pool, instructions that, when executed, provide an interface for configuring the agent pool may be transmitted, from the contact center builder system to the content provider system. Data corresponding to a configuration of the one or more agents and one or more respective skills associated with each agent may be received, from the content provider system to the contact center builder system. In response to receiving the data corresponding to the configuration of the one or more agents and the one or more respective skills associated with each agent, the one or more agents and the one or more respective skills associated with each agent may be assigned to the agent pool.

To generate multiple interaction pages for the interaction site, an interaction page of another interaction site is configured to handle the task without an agent may be determined. In response to determining that the interaction page of another interaction site is configured to handle the task without an agent, an interaction page configured to handle the task without an agent may be generated based on the interaction page of another interaction site.

An attribute of the content provider based on the data may be identified. One or more other content providers share the attribute may be determined. In response to determining that one or more other content providers share the attribute, one or more tasks handled by one or more other contact centers of the one or more other content providers may be identified. The one or more tasks may be presented to the content provider system. The attribute may include a name of the content provider, an industry of the content provider, or a task performed by the content provider. To identify the attribute of the content provider, the attribute of the content provider may be inferred based on the data.

Interaction data representing historical user interactions may be received. One or more tasks using the interaction data may be extracted. The one or more tasks may be presented to the content provider system. To extract one or more tasks using the interaction data, fragments of the interaction data may be generated. The fragments of the interaction data into one or more clusters may be grouped. Each of the one or more clusters with a respective task may be classified. The interaction data may include speech data or text data transcribed from the speech data.

An interaction flow document may be generated, the interaction flow document including code for the interaction site specifying the multi-step communication flow. The code of the interaction flow document may include XML scripts that correspond to the interaction pages of the interaction site. The multiple communications channels may include at least one of a SMS channel, a chat channel, and an email channel.

In another general aspect of a system includes one or more processors and one or more non-transitory computer-readable storage devices storing instructions that, when executed by the one or more processors, cause the one or more processors to perform operations including transmitting, to a content provider system of a content provider, instructions that, when executed, provide an interface for configuring a contact center for the content provider that includes a contact center telephone number, an agent pool, and an interaction site, the interaction site enabling communications between a user device and a communications system over any of multiple communications channels, including an interactive voice response (IVR) channel, where the interaction site specifies a multi-step communication flow between the user device and the communications system, and where the multi-step communication flow is determined based on multiple interaction pages configurable by a developer of the content provider system; receiving, from the content provider system, data associated with one or more contact center configuration parameters; assigning the contact center telephone number to the contact center based on the data; assigning one or more agents to the agent pool of the contact center based on the data; determining that the data includes a task to be handled by the communications system without using an agent of the agent pool; and in response to determining that the data includes the task to be handled by the communications system without using an agent of the agent pool, generating multiple interaction pages for the interaction site, where at least one interaction page of the multiple interaction pages enables a caller of a user device to communicate with the communications system to reach an agent of the agent pool, and where at least one other interaction page of the multiple interaction pages enables a caller of a user device to communicate with the communications system to complete the task using the IVR channel without using an agent of the agent pool.

To assign the contact center telephone number to the contact center, one or more candidate telephone numbers may be selected from multiple telephone numbers provided by multiple telephone carriers. Instructions that, when executed, provide an interface for selecting one of the one or more candidate telephone numbers may be transmitted, from the contact center builder system to the content provider system. Data representing a selection of a particular telephone number of the one or more candidate telephone numbers may be received, from the content provider system to the contact center builder system. In response to receiving the data representing the selection of the particular telephone number, the particular telephone number may be assigned to the contact center as the contact center telephone number.

To assign one or more agents to the agent pool, instructions that, when executed, provide an interface for configuring the agent pool may be transmitted, from the contact center builder system to the content provider system. Data corresponding to a configuration of the one or more agents and one or more respective skills associated with each agent may be received, from the content provider system to the contact center builder system. In response to receiving the data corresponding to the configuration of the one or more agents and the one or more respective skills associated with each agent, the one or more agents and the one or more respective skills associated with each agent may be assigned to the agent pool.

In another general aspect of a contact center builder system includes a contact center builder interface configured to transmit, to a content provider system of a content provider, instructions that, when executed, provide an interface for configuring a contact center for the content provider that includes a contact center telephone number, an agent pool, and an interaction site, the interaction site enabling communications between a user device and a communications system over any of multiple communications channels, including an interactive voice response (IVR) channel, where the interaction site specifies a multi-step communication flow between the user device and the communications system, and where the multi-step communication flow is determined based on multiple interaction pages configurable by a developer of the content provider system; and receive, from the content provider system, data associated with one or more contact center configuration parameters. A telephone number configuration system configured to assign the contact center telephone number to the contact center based on the data. An agent configuration system configured to assign one or more agents to the agent pool of the contact center based on the data. An application configuration system configured to determine that the data includes a task to be handled by the communications system without using an agent of the agent pool; and in response to determining that the data includes the task to be handled by the communications system without using an agent of the agent pool, generate multiple interaction pages for the interaction site, where at least one interaction page of the multiple interaction pages enables a caller of a user device to communicate with the communications system to reach an agent of the agent pool, and where at least one other interaction page of the multiple interaction pages enables a caller of a user device to communicate with the communications system to complete the task using the IVR channel without using an agent of the agent pool.

To assign the contact center telephone number to the contact center, one or more candidate telephone numbers may be selected from multiple telephone numbers provided by multiple telephone carriers. Instructions that, when executed, provide an interface for selecting one of the one or more candidate telephone numbers may be transmitted, from the contact center builder system to the content provider system. Data representing a selection of a particular telephone number of the one or more candidate telephone numbers may be received, from the content provider system to the contact center builder system. In response to receiving the data representing the selection of the particular telephone number, the particular telephone number may be assigned to the contact center as the contact center telephone number.

To assign one or more agents to the agent pool, instructions that, when executed, provide an interface for configuring the agent pool may be transmitted, from the contact center builder system to the content provider system. Data corresponding to a configuration of the one or more agents and one or more respective skills associated with each agent may be received, from the content provider system to the contact center builder system. In response to receiving the data corresponding to the configuration of the one or more agents and the one or more respective skills associated with each agent, the one or more agents and the one or more respective skills associated with each agent may be assigned to the agent pool.

The details of one or more implementations are set forth in the accompanying drawings and the description below. Other potential features and advantages will become apparent from the description, the drawings, and the claims.

BRIEF DESCRIPTION OF THE FIGURES

FIGS. 5A-5C illustrates a GUI for an application development platform for viewing and modifying interaction sites generated by the contact center builder platform.

DETAILED DESCRIPTION

Figure 1:
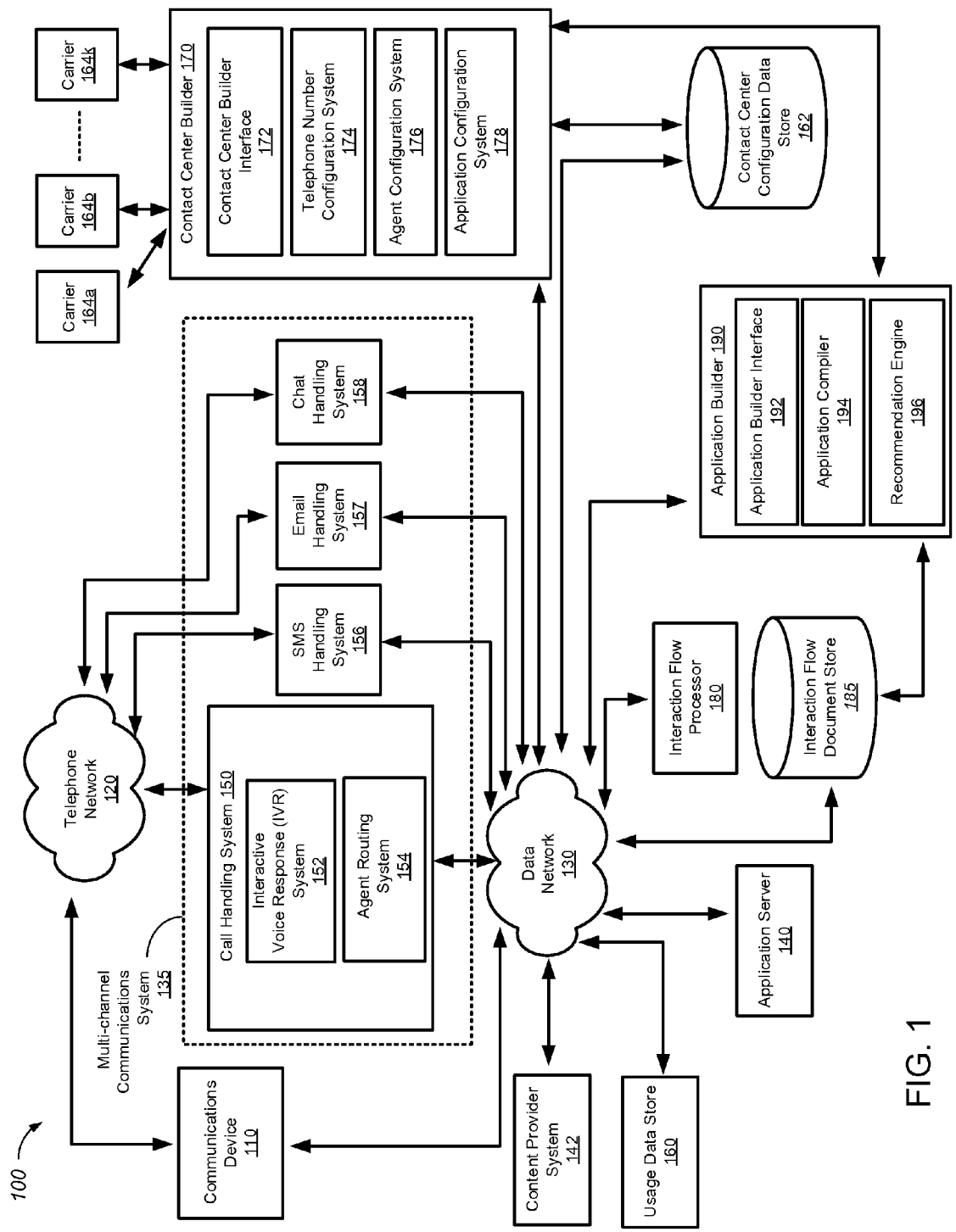
FIG. 1 is a block diagram of a communications system that enables development of contact centers, and enables users access to contact centers in a multi-channel solution platform.

A company may wish to enable its customers to contact it through use of a contact center via any of multiple different communications channels (e.g., phone, email, chat, SMS or another communications channel that supports communications between a customer and a service/product provider). To save costs, the company may wish to interact with the customers, at least initially, using an automated response system. Use of such an automated response system may decrease the costs associated with responding to customer contacts by decreasing the number of human agents that need to be employed to respond to the customer contacts. Many customer contacts are for routine inquiries (e.g., a customer contacts the company to check the balance of a checking account or of a credit card) and, therefore, lend themselves well to being efficiently and cost-effectively handled through use of an automated response system. In contrast, more complex customer contacts, which are typically far fewer in number, may be routed to human agents for handling.

One effective way to set up a contact center is to work with a third-party service provider to setup a virtual contact center. A virtual contact center is advantageous because a company can leverage the service provider's infrastructure to expand the contact center as needed. For example, when a customer dials the contact center telephone number assigned to the virtual contact center, the call is routed by a telephone network carrier to the service provider's call handling system, which is capable of handling a large number of calls. The call handling system initiates an automated response application designed for the company to start an interaction with the customer, and either completes the customer's inquiry through a multi-step automated interaction or routes the customer to the appropriate human agent. The automated response application and the agent routing scheme can be highly configurable to fit a business' changing needs.

However, the conventional process of setting up a contact center can be time consuming and expensive. First, to establish a contact center for a company, the service provider needs to work with a telephone network carrier to obtain a contact center telephone number and to set up the routing path from the carrier's network to the service provider, and this process can take days or longer. Second, a company often needs to have multiple one-on-one conversations with a service provider representative to communicate the skills required by the human agents to support the company's needs, and the service provider may need to manually set up the appropriate agent routing scheme. Third, a company needs to invest time and resources for the initial development of the automated response application for the contact center.

In a multi-tenant Software-as-a-Service (SaaS) environment, where a service provider hosts contact centers for a large number of companies across different industries, the service provider can leverage its existing relationships with telephone network carriers and content provider companies to implement an automated contact center builder platform for setting up contact centers. For example, prior to a contact center set up process, the service provider can work with multiple telephone network carriers to obtain a pool of contact center telephone numbers and to establish the call routing paths for these contact center telephone numbers in the pool. When a company initiates the contact center set up process using the automated contact center builder platform, the company is able to select one or more telephone numbers from the pool of contact center telephone numbers to meet its business needs. As another example, contact center requirements of a company can be obtained in an automated manner using a series of interactive graphic user interfaces of the automated contact center builder platform. Based on the contact center requirements, the service provider can determine which tasks can be handled without a human agent, and an automated response application for the company can be created through an automated backend process. As another example, companies in the same industry often share similar business needs, and the service provider can leverage the contact center data of existing companies in one industry to automatically provide recommendations on the automated contact center builder platform to shorten the contact center set up process. As another example, a company can define skills needed to support a service using an automated graphic user interface of the automated contact center builder platform, and assign these skills to appropriate human agents using the graphic user interface without the need to communicate with a service provider representative.

The contact center builder platform may generate an automated response application for the content provider at the end of a contact center set up process. The interaction between a customer and an automated response application may be designed by a content provider offering the service using an interaction flow that segments the interaction into multiple discrete steps. For example, when a customer dials a company's telephone number to pay a bill, a voice interaction flow may include the steps of (i) acquiring the customer's account number, (ii) informing the customer of a current balance, (iii) acquiring the customer's payment information, (iv) processing payment, and (v) conducting a customer satisfaction survey. Each of the above automated steps may be implemented using artifacts. In this application, an artifact, a construct, or a building block may be used interchangeably, and an artifact refers to a computer program, a portion of a computer program, or computer software code configured to perform a specific function. For example, an interaction site that is configured to specify a multi-step communication flow between a user and an automated response system may be an artifact. As another example, an interaction page that is configured to perform a step of the multi-step communication flow may be an artifact. The content provider can readily refine the interaction site including each of the interaction pages in an application builder platform. Example implementations of an application builder platform are described in further detail in pending application Ser. No. 14/193,407, which is incorporated herein by reference for all purposes.

For ease of exposition, the following description begins by describing a voice site, which is configured to receive and respond to telephone contacts, and then expands the description to cover an interaction site that supports contacts over any one of multiple different communication channels (e.g., email contacts, chat contacts, and SMS contacts). Note that an artifact is not limited to an interaction site or an interaction page, and may include any building block that facilitates interactions between a user and a communications system.

A user of a particular product or service provided by the company may need to contact customer service for the product or service to troubleshoot a problem the user is experiencing in using the product or service. In order to contact the customer service and obtain a solution to the problem, the user may call a known customer service number for the product or service. By calling the customer service number, the user may get connected to a call handling system that enables the user to interact with a voice site associated with the product or service.

A voice site is a set of scripts or, more generally, programming language modules corresponding to one or more linked pages that collectively interoperate to produce an automated interactive experience with a user. A standard voice site includes scripts or programming language modules corresponding to at least one voice page and limits the interaction with the user to an audio communications mode. Because customers typically access a voice site by calling a telephone number using a telephone, a standard voice site is typically referred to as a single channel interaction site, i.e., an interaction site that supports a single type of contact. An enhanced voice site may include scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). An enhanced voice site may, therefore, be referred to as a single channel interaction site that has been enhanced to enable some portions of the interaction flow to involve the communication of multimedia information. Notably, a call may be said to be directed to a voice site if it is directed to a telephone number that has been defined as corresponding to the voice site.

The voice site called by the user may be an automated interactive voice site that is configured to process, using pre-programmed scripts, information received from the user that is input through the telephonic device being used by the user, and, in response, provide information to the user that is conveyed to the user through the telephonic device. The interaction between the user and the voice site may be done using an interactive voice response system (IVR) provided by a service provider that is hosting the voice site. The IVR is configured to support voice commands and voice information using text-to-speech processing and natural language processing by using scripts that are pre-programmed for the voice site, for example, voice-extensible markup language (VoiceXML) scripts. The IVR interacts with the user by using audible commands to prompt the user to provide information and enabling the user to input the information by speaking into the telephonic device or by pressing buttons on the telephonic device (when using, for example, a touch-tone telephone). The information input by the user is conveyed to the IVR over a voice communications session that is established between the telephonic device and the IVR when the call is connected. Upon receiving the information, the IVR processes the information using the pre-programmed scripts. The IVR may be configured to send audible responses back to the user via the telephonic device.

In some implementations, the voice site may be an enhanced voice site that is configured to support multimedia information including audio, video, images and text. The telephonic device also may be an advanced telephonic device (e.g., a smart phone) provided with a display for conveying visual information to the user, and a processor capable of performing complex tasks such as logic processing where the associated instructions may be stored in memory included in the telephonic device. In such circumstances, the advanced telephonic device and the enhanced voice site can interact using one or more of voice, video, images or text information and commands.

As noted previously, a customer typically accesses a voice site by calling a contact center telephone number using a telephone. A voice site, therefore, is a single channel interaction site in that it receives and responds to contacts that are telephone calls. In contrast, a multi-channel interaction site receives and responds to contacts in an automated fashion received via any one of multiple different communications channels supported by a multi-channel communications system/platform. For example, a multi-channel interaction site may receive and respond to contacts that are telephone calls, email messages, SMS messages, and/or chat messages. Moreover, the multi-channel interaction site may provide the same interaction flow with the customer irrespective of which channel was used by the customer to initially contact the site. For example, the same or substantially the same interaction flow may be used for enabling the customer to access their bank account information and perform banking transactions, irrespective of which type of contact is used by the customer to contact the bank's automated response system.

Interacting with a multi-channel interaction site may be useful in several situations. A multi-channel interaction site allows the user to receive the same service, independent of how the user wishes to contact the company associated with the multi-channel interaction site and independent of the device that the user wishes to use when contacting the company. For example, if the user is operating a telephonic device but does not wish to talk to a person or a machine, the user may contact customer service for the same product or service via short message service (SMS) using a short code and a keyword. As another example, if the user is operating a laptop computer or other types of communications devices, the user may contact customer service for the same product or service via a chat room using a hyperlink or a website address. As another example, if the user does not have time to complete the entire service transaction in one continuous session, the user may contact customer service for the same product or service via an email and interact with the customer service via the subsequent communication of one or more emails or, alternatively, one or more instant messages or chat messages.

An interaction site accessed by the user may be an automated interaction site that is configured to process, using pre-programmed scripts, information received from the user that is input through the communications device being used by the user via the communications channel used by the user to contact (i.e., initially contact) the site. The interaction site may, in response, provide information to the user that is conveyed to the user through the communications device via the same communications channel. A standard interaction site limits the interaction with the customer to the mode of communications associated with the communications channel used by the customer to contact the site. A standard interaction site is a set of scripts or, more generally, programming language modules corresponding to one or more linked interaction pages that collectively interoperate to produce an automated interactive experience with a user. A standard interaction site may be either a single channel interaction site (e.g., a standard voice site), which receives and responds to contacts received over a single channel, or a multi-channel interaction site, which receives and responds to contacts received over any of multiple different channels.

In contrast, an enhanced interaction site may include scripts or programming language modules corresponding to at least one interaction page and at least one multimodal action page linked to the at least one interaction page that enable interaction with the user to occur via the communications mode used by the user to initially contact the site (e.g., an audio communications mode for a telephone call contact) and at least one additional communications mode (e.g., a text communications mode, an image communications mode or a video communications mode). An enhanced interaction site may, therefore, be either a single channel interaction site (e.g., an enhanced voice site) or a multi-channel interaction site that has been enhanced to enable some portions of the interaction flow to involve the communication of multimedia information.

The interaction between the user and the interaction site may be done using a sub-system directed to servicing a particular communications channel (e.g., an IVR, which is directed to servicing telephone call contacts) in a multi-channel communications system provided by a service provider that is hosting the interaction site. Each sub-system in the multi-channel communications system may be configured to support a particular communications channel, and to process commands and information by using scripts or programming modules that are translated from pre-programmed scripts or programming modules that constitute the interaction site. That is, an interaction site may be a set of scripts or programming modules that offer a common interaction flow for handling contacts received over different channels. The set of scripts or programming modules may then be translated by an interaction flow processor into a corresponding set of channel-specific scripts or programming modules for each channel supported by the interaction site, and these translated channel-specific scripts or programming modules may then be executed by the respective sub-systems of the multi-channel communications system to enable automated interactions with users over the different channels. For example, the pre-programmed scripts of the interaction site may be extensible markup language (XML) scripts. If the user accesses the multi-channel communications system by using a telephone to call a telephone number associated with the interaction site, the interaction flow processor may translate the XML scripts of the interaction site to VoiceXML scripts for processing by an IVR to interact with the calling user.

The interaction site may be hosted by a third party service provider that facilitates the creation and hosting of interaction sites on servers owned and operated by the service provider. The service provider may provide a service/method that enables the design, development, and hosting of interaction sites or applications that run a thin client on the communications device that interacts with a fully hosted, on-demand interaction solution platform maintained and managed by the service provider. The service/method provides a way to develop an interaction site that is supported by a multi-channel communications system (the server side) and allows a communications interaction between the client and the server to be established via any one of the communications channels supported by the interaction site. In some implementations, the service/method may require an installation of a thin client engine (e.g., an application) on the communications device of the user that mediates between the objects and devices in the communications device and the multi-channel communications system supporting the interaction site hosted by the service provider.

In the above scenario, the role of the entity providing customer service through the interaction site is that of a content provider. The developer of the entity/company (hereinafter referred to interchangeably as the "content provider") configures the interaction site that is to be used for the particular product or service and provides the logic for the interaction site that is to be executed by the multi-channel communications system. The content provider may do so by using a graphical user interface (GUI) provided by the third party service provider for configuring the interaction site. The service provider handles the interpretation and compilation of the information provided by the content provider, and the creation and hosting of the interaction site based on the information. Since the service provider manages the multi-channel communications system, the service provider may allow the content provider to develop the interaction site using one unified GUI interface, where the interaction site is executable by the user via any one or more of multiple different communications channels. In some implementations, the interaction site may be executable to the user using multiple different communications channels within one communications session.

The service/method thus enables the deployment of interaction-enabled solutions on communications devices without requiring the content provider to engage in complex programming. Applications, or interaction sites, may be designed by the content provider using a web-based or remotely accessible interface, and served on demand to clients. In some implementations, clients can be add-ons that smart phone applications can plug into. In some implementations, the service/method enables users to interact with a multi-channel application. The application is referred to as multi-channel in that it enables users to contact and interact with a multi-channel interaction platform via any of multiple different communications channels (e.g., phone, email, chat, Short Message Service (SMS), or another communications channel that supports communications between the user and the interaction site). For example, the user may contact the multi-channel platform (e.g., by phone) and provide information to the multi-channel platform by speaking and may receive information from the multi-channel platform by hearing. Alternatively, the user may instead choose to contact the multi-channel platform (e.g., by SMS, chat room, or email) and provide the same information to the multi-channel platform by typing text and receive the same information from the multi-channel platform by reading text.

FIG. 1 is a block diagram of a communications system 100 that provides a development platform for contact centers and provides access to these contact centers in a multi-channel solution platform. Referring to FIG. 1, a user of a communications device (i.e., a smart phone) 110 is able to interact with the communications device 110 to request a service from an interaction site of a contact center that is provided, for example, by a content provider. The service may be, for example, a request to purchase a particular product or service offered by or made available by the content provider through the interaction site. For example, the user may indicate a desire to request a service from the interaction site by selecting a graphically displayed icon on a graphical user interface (GUI) of the communications device 110 to thereby invoke an application stored in the communications device 110 with which the user can interact to initiate a service request. Additionally or alternatively, the user may indicate a desire to request a service by inputting, via manual selection or otherwise, a telephone number associated with the contact center into the communications device 110 and initiating a call directed to the inputted telephone number. Additionally or alternatively, the user may indicate a desire to request a service by inputting and sending, via manual selection or otherwise, a SMS message that includes a short code and a keyword associated with the contact center into the communications device 110. Additionally or alternatively, the user may indicate a desire to request a service by inputting, via manual selection or otherwise, a uniform resource locator (URL) associated with the contact center into the communications device 110 to initiate a chat session with the customer service department. Additionally or alternatively, the user may indicate a desire to request a service by inputting and sending, via manual selection or otherwise, an email that includes an email address associated with the contact center into the communications device 110. Additionally or alternatively, the user may indicate a desire to request a service via a communications channel not listed in the above examples.

In some implementations, the request for the service or product may be directed to a multi-channel communications system 135, and an interaction site may be invoked, where the multi-channel communications system 135 communicates with the communications device 110 to provide the requested service. For example, a user of the communications device 110 may dial a contact center telephone number associated with a content provider, and the call may be routed by a telephone network carrier to a call handling system 150 of the multi-channel communications system 135, where an IVR system 152 may invoke a voice site associated with the content provider to initiate a multi-step voice communication with the user. If the call handling system 150 determines that a human agent is required to service the call, the agent routing system 154 may forward the call to an agent of the agent pool. As mentioned previously, a contact center and an associated interaction site may be hosted by a third party service provider that facilitates the creation and hosting of contact centers and interaction sites on servers owned and operated by the service provider. A communications system that can provide a contact center builder platform that offers an automated way to configure a contact center and yields a contact center and an associated interaction page in real-time may enable a content provider to enjoy a decrease in costs and development time associated with developing contact centers.

The communications system 100 is an example implementation of a system that supports an interactive multi-channel delivery platform. In general, the communications system 100 includes, a telephone network 120, a data network 130, the multi-channel communications system 135, a content provider system 142, a contact center configuration data store 162, a contact center builder 170, an interaction flow processor 180, an interaction flow document database 185, and an application builder 190. The communications system 100 may additionally include an application server 140, and a usage data store 160.

The communications device 110 is configured to allow a user to interact with the multi-channel communications system 135 across the telephone network 120 and/or across the data network 130. The communications device 110 may be a cellular phone or a mobile personal digital assistant (PDA) with embedded cellular phone technology. The communications device 110 may be a computer that includes one or more software or hardware applications for performing communications between the communications device 110 and the multi-channel communications system 135. The communications device 110 may have various input/output devices with which a user may interact to provide and receive audio, text, video, and other forms of data.

The telephone network 120 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications. As another example, the telephone network 120 may include an IP Multimedia Subsystem (IMS).

The data network 130 is configured to enable direct or indirect communications between the communications device 110, the multi-channel communications system 135, and/or the application server 140. Examples of the data network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data. In some implementations, the data network 130 and the telephone network 120 are implemented by a single or otherwise integrated communications network configured to enable communications between the communications device 110 and the multi-channel communications system 135.

A multi-channel communications system 135 receives the request and interacts with the communications device 110 to provide the requested service through the interaction site. The multi-channel communications system 135 may include a call handling system 150, a SMS handling system 156, an email handling system 157, and a chat handling system 158. In some implementations, the multi-channel communications system 135 may include systems that are configured to handle other media channels. For example, the multi-channel communications system 135 may include a multimedia messaging service (MMS) handling system configured to handle MMS messages.

The call handling system 150 is configured to handle a request to interact with an interaction site using a voice channel. The call handling system 150 may include an IVR system 152 configured to receive a call from the communications device 110 when the communications device 110 is operating under a voice communications channel. In some implementations, the call handling system 150 may additionally include an agent routing system 154.

The IVR 152 may include a voice gateway coupled to an interaction flow processor 180 via a data network. Alternatively, the voice gateway may be local to the interaction flow processor 180 and connected directly to the interaction flow processor 180. The voice gateway is a gateway that receives user calls from or places calls to voice communications devices, such as the communications device 110, and responds to the calls in accordance with a voice program that corresponds to a flow of an interaction site. The voice program may be accessed from local memory within the voice gateway or from the interaction flow processor 180. In some implementations, the voice gateway processes voice programs that are script-based voice applications. The voice program, therefore, may be a script written in a scripting language such as, for example, voice extensible markup language (VoiceXML) or speech application language tags (SALT). The IVR 152 may also be configured to communicate with the data store 160 to read and/or write user interaction data (e.g., state variables for a data communications session) in a shared memory space or any centralized or distributed memory storage architecture.

The agent routing system 154 of the call handling system may include, among other components, an inbound call queue, an outbound call request queue, a call router, an automatic call distributor ("ACD") administrator, and contact information of a plurality of agents. The agent routing system 154 may receive one or more calls from one or more voice communication devices, such as the communications device 110, via the telephone network 120 and may make one or more outbound calls to voice communication devices of an agent via the telephone network 120. The agent routing system 154 may determine an appropriate agent to route the call to or to assign an outbound call to. The determination of an appropriate agent may be based on agent skills, agent performance metrics and information known about the inbound or outbound call and the status of the agent.

The SMS handling system 156 is configured to handle a request to interact with an interaction site using a SMS channel. The SMS handling system 156 may include a SMS gateway coupled to an interaction flow processor 180 via a data network. Alternatively, the SMS gateway may be local to the interaction flow processor 180 and connected directly to the interaction flow processor 180. The SMS gateway is a gateway that receives user SMS messages from or places SMS messages to communications devices, such as the communications device 110, and responds to the SMS messages in accordance with a SMS program that corresponds to a flow of an interaction site. The SMS program may be accessed from local memory within the SMS gateway or from the interaction flow processor 180. In some implementations, the SMS gateway processes voice programs that are script-based SMS applications. The SMS program, therefore, may be a script written in a scripting language such as, for example, extensible markup language (XML). The SMS handling system 156 may also be configured to communicate with the usage data store 160 to read and/or write user interaction data (e.g., state variables for a data communications session) in a shared memory space. Although not shown in FIG. 1, in some implementations, the SMS handling system 156 may additionally include an agent routing system that routes a user to a human agent.

The email handling system 157 is configured to handle a request to interact with an interaction site using an email channel. The email handling system 157 may include an email gateway coupled to an interaction flow processor 180 via a data network. Alternatively, the email gateway may be local to the interaction flow processor 180 and connected directly to the interaction flow processor 180. The email gateway is a gateway that receives user emails from or places emails to communications devices, such as the communications device 110, and responds to the emails in accordance with an email program that corresponds to a flow of an interaction site. The email program may be accessed from local memory within the email gateway or from the interaction flow processor 180. In some implementations, the email gateway processes email programs that are script-based email applications. The email program, therefore, may be a script written in a scripting language such as, for example, extensible markup language (XML). The email handling system 157 may also be configured to communicate with the usage data store 160 to read and/or write user interaction data (e.g., state variables for a data communications session) in a shared memory space. Although not shown in FIG. 1, in some implementations, the email handling system 157 may additionally include an agent routing system that routes a user to a human agent.

The chat handling system 158 is configured to handle a request to interact with an interaction site using a chat channel. The chat handling system 158 may include a chat gateway coupled to an interaction flow processor 180 via a data network. Alternatively, the chat gateway may be local to the interaction flow processor 180 and connected directly to the interaction flow processor 180. The chat gateway is a gateway that receives user message from or places messages in a chat session to communications devices, such as the communications device 110, and responds to the messages in accordance with a chat program that corresponds to a flow of an interaction site. The chat program may be accessed from local memory within the chat gateway or from the interaction flow processor 180. In some implementations, the chat gateway processes chat programs that are script-based email applications. The chat program, therefore, may be a script written in a scripting language such as, for example, extensible markup language (XML). The chat handling system 158 may also be configured to communicate with the usage data store 160 to read and/or write user interaction data (e.g., state variables for a data communications session) in a shared memory space. Although not shown in FIG. 1, in some implementations, the chat handling system 158 may additionally include an agent routing system that routes a user to a human agent.

The interaction flow processor 180 includes all hardware and software components that interface and provide data to the multi-channel communications system 135. Depending on the communications channel between the user of the communications device 110 and the multi-channel communications system 135, the interaction flow processor 180 sends translated application programs or scripts to the multi-channel communications system 135 for processing user interactions. The user interactions are analyzed by the multi-channel communications system 135 and new programs or scripts that correspond to the next state of the interaction flow may then be sent to the multi-channel communications system 135 for further processing. In some implementations, the interaction flow processor 180 may determine which programs or scripts to provide to the multi-channel communications system 135 based on some or all of the information received from the multi-channel communications system 135 or the communications device 110.

The interaction flow document database 185 stores interaction flow documents created by the application builder 190, and provides the interaction flow processor 180 access to these interaction flow documents. In some implementations, the interaction flow document database 185 may be an array of high-capacity storage drives that are closely coupled to the interaction flow processor 180. In some implementations, the interaction flow document database 185 may be an array of high-capacity storage drives that are closely coupled to the application builder 190.

The content provider system 142 is configured to allow a content provider to interact with the contact center builder 170 and/or the application builder 190 across the data network 130. The content provider system 142 may be a cellular phone or a mobile personal digital assistant (PDA) with embedded cellular phone technology. The content provider system 142 may be a computer that includes one or more software or hardware applications for performing communications between content provider system 142 and the application builder 190. The content provider system 142 may have various input/output devices with which a content provider may interact to provide and receive audio, text, video, and other forms of data from the application builder 190.

The contact center builder 170 facilitates the creation of contact centers. The contact center builder 170 utilizes various components to enable the creation of contact centers. The various components of the contact center builder 170 may be co-located in a single physical location, or they may be geographically distributed, with dedicated high capacity links interconnecting the various components. The contact center builder 170 may include a contact center builder interface 172, a telephone number configuration system 174, an agent configuration system 176, and an application configuration system 178.

The contact center builder interface 172 is a GUI front-end for a contact center development tool that can be used to build a contact center for a content provider. The content provider may access the contact center builder interface 172 over the data network 130. For example, the content provider may use a web browser that runs on the content provider system 142. By accessing the contact center development tool using the contact center builder interface 172, the content provider may create and/or maintain call centers that will be hosted by the third-party service provider and be used to service a customer's request using any one of multiple communications channels. FIGS. 2A-2H illustrate examples of one or more pages provided by a GUI of a call center builder tool.

The telephone number configuration system 174 is operable to determine a selection of candidate contact center telephone numbers from a pool of telephone numbers that can be assigned to contact centers. In some implementations, prior to a content provider setting up a contact center, the service provider may work with multiple telephone network carriers 164a-164k, where k is any integer, to obtain multiple telephone numbers and to set up the appropriate routing to the multi-channel communications system 135. The multiple telephone numbers may be stored as a pool in a database. During a contact center set up process, the telephone number configuration system 174 may access the pool to provide the content provider one or more telephone numbers as candidate telephone numbers for the contact center. In some implementations, the selection of candidate contact center telephone numbers is determined based on the content provider's input. For example, the content provider may specify that a local telephone number for New York City is required. In response, the telephone number configuration system 174 may select one or more telephone numbers that are local for New York City.

The agent configuration system 176 is operable to configure agent information for a contact center. The agent information may be accessed by the agent routing system 154 to route a user to an appropriate agent. In general, the agent information is provided by the content provider system 142 through the contact center builder interface 172. For example, the agent information may include one or more of a name of the agent, an e-mail of the agent, a phone number contact of the agent, one or more skills of the agent, one or more products supported by the agent, and whether the agent is responsible as a supervisor. In some implementations, the agent information may be stored in the contact center configuration data store 162.

The application configuration system 178 is operable to generate an interaction site for the contact center. In general, a content provider inputs through the contact center builder interface 172 data specifying tasks that can be handled without human agents and tasks that need to be handled with human agents. Based on the data, the application configuration system 178 may generate one or more interaction pages that handle the specified tasks. In some implementations, the application configuration system 178 accesses the application builder 190 to generate the interaction pages. For example, the application configuration system 178 may provide data to the recommendation engine 196 of the application builder 190 to identify an interaction site or an interaction page that may handle the specified task. As another example, the application configuration system 178 may use the application compiler 194 of the application builder 190 to generate the interaction site. In some implementations, the application configuration system 178 may store the generated interaction site as an interaction flow document in the interaction flow document store 185.

The application builder 190 facilitates the creation of interaction sites. The application builder 190 utilizes various components to enable the creation of interaction sites. The various components of the application builder 190 may be co-located in a single physical location, or they may be geographically distributed, with dedicated high capacity links interconnecting the various components. The application builder 190 may include an application builder interface 192 and an application compiler 194.

The application builder interface 192 is a GUI front-end for an application development tool that can be used to build an interaction site that is capable of handling interactions using multiple communications channels. The content provider may access the application builder interface 192 over the data network 130. For example, the content provider may use a web browser that runs on the content provider system 142. By accessing the application development tool using the application builder interface 192, the content provider may create interaction sites and interaction pages that will be used by the multi-channel communications system 135 when processing a request to the interaction site being created by the content provider. In the context of this discussion, a "page" is a discrete programming routine configured to perform a discrete function. A page may be defined by a user through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by a handling system to execute the discrete programming routine to thereby perform the discrete function of the page. Examples of different pages include message pages, question pages, logic pages, transaction pages, and multimodal action pages. These different pages are described in further detail in pending application Ser. No. 14/170,722, which is incorporated herein by reference for all purposes.

Figure 5A:
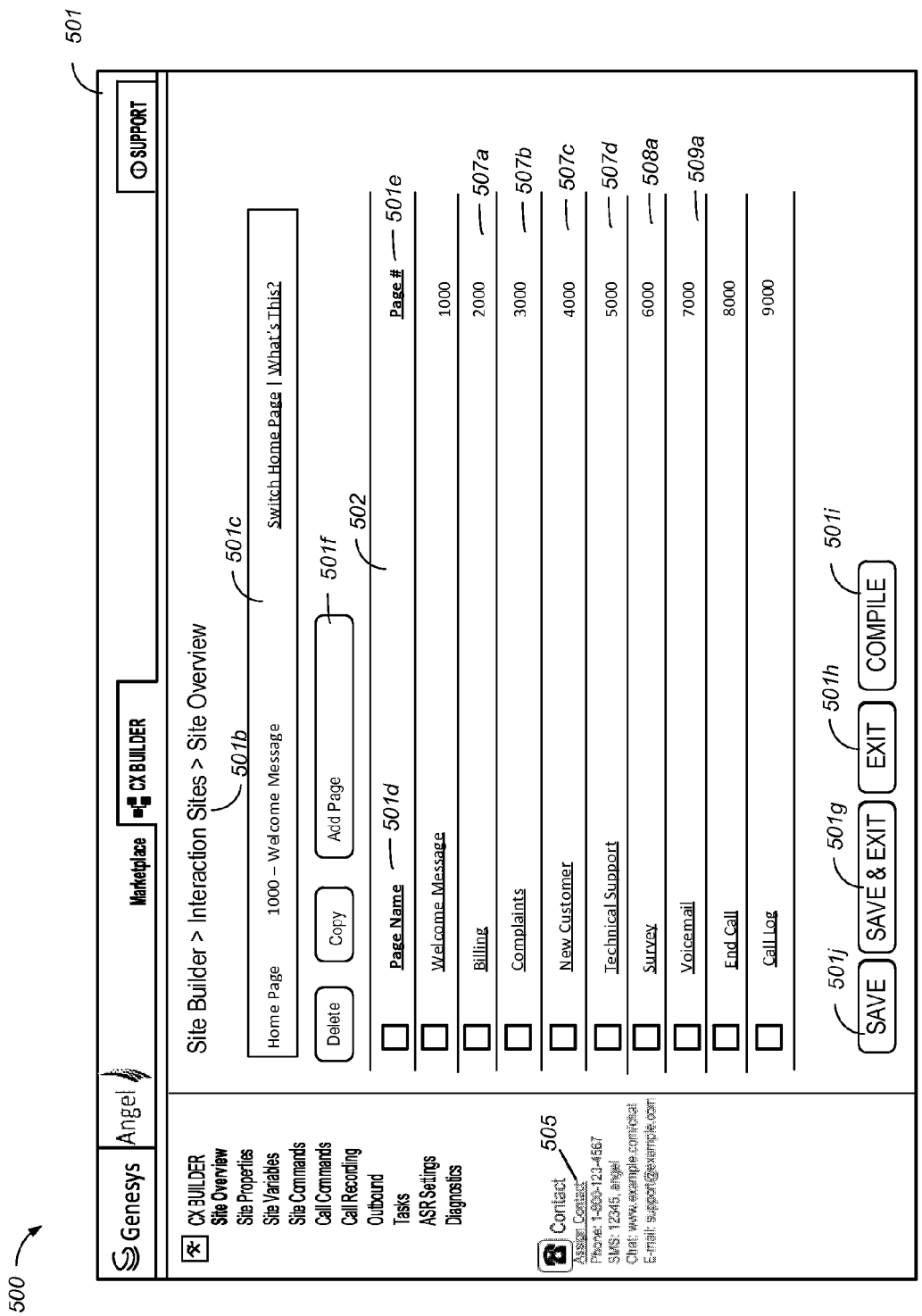
Figure 5B:
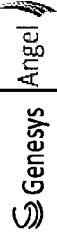
Figure 5C:
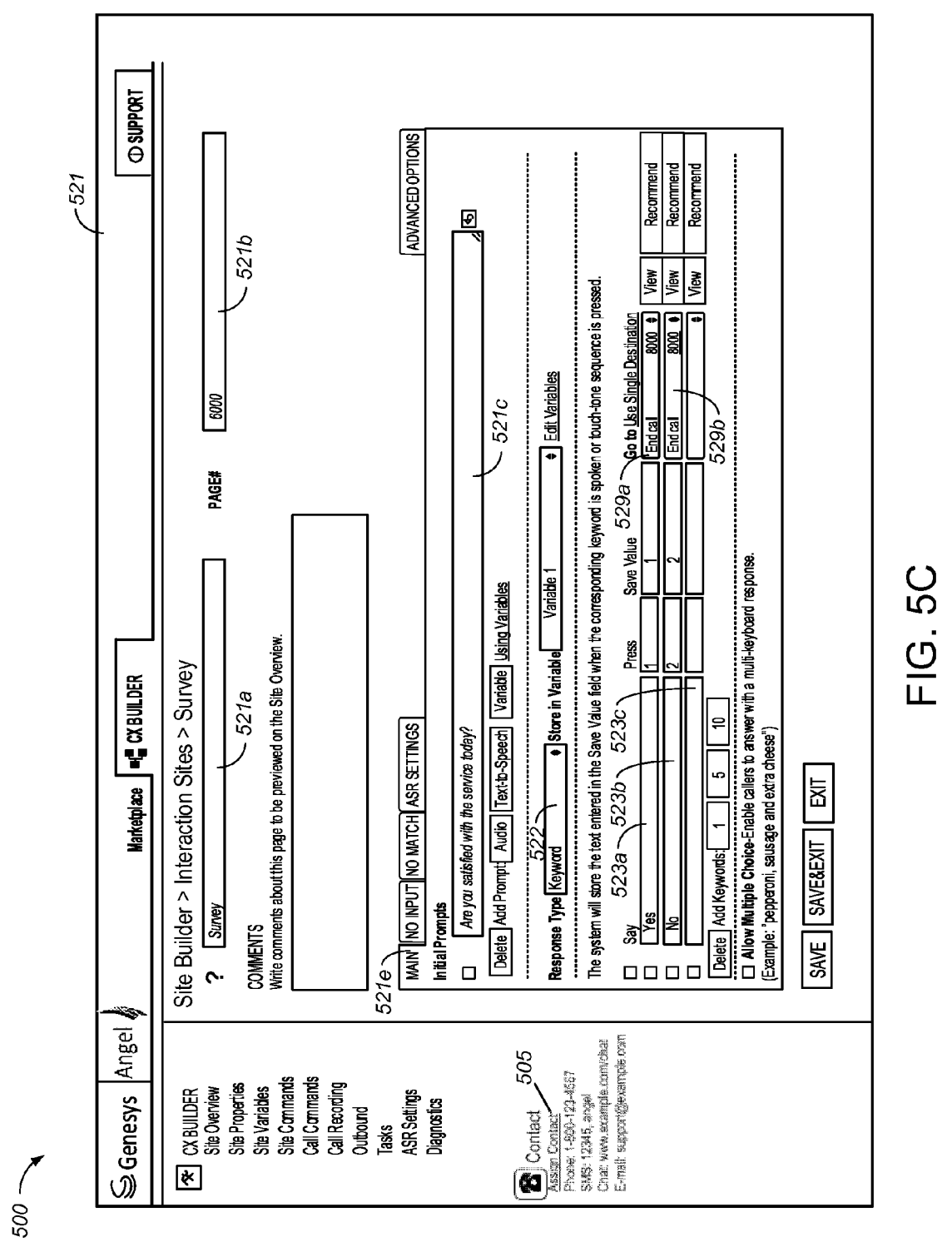

An interaction page is a particular type of page that is configured to perform the function of delivering content to and/or receiving content from a user via a communications channel used by the user to contact the multi-channel system (e.g., voice communications channel for telephone contacts, chat communications channel for chat contacts, email communications channel for email contacts, and SMS communications channel for SMS contacts). A "voice page" is a particular type of interaction page that is configured to perform the function of delivering audible content to and/or receiving audible content from a user that called a telephone number assigned to the interaction site. The user is typically a caller to an IVR and the audible content is typically speech. FIGS. 5A-5C illustrate examples of one or more pages provided by a GUI of an application development tool.

The interaction sites and pages created by the content provider using the application builder interface 192 are interpreted and/or compiled by an application compiler 194 to generate scripts that are executed by the multi-channel communications system interacting with a user accessing the interaction site. In some implementations, the application compiler 194 may generate an interaction flow document, which may include XML scripts or code that correspond to pages (i.e., programming modules) of an interaction site created by the content provider. The interaction flow document may be stored in an interaction flow document database 185. The interaction flow processor 180 may access the scripts from the interaction flow document database 185 and translate them into a language and/or a format that can be processed by a particular handling system when the multi-channel communications system 135 interacts with a user accessing the interaction site.

In addition to the XML scripts, the application compiler 194 may also generate other types of scripts (e.g. SCXML scripts or Java scripts) and other types of executable code using other programming languages based on pages created for the interaction site by the content provider (e.g., based on transaction pages). The other types of scripts may be used by the multi-channel communications system 135 to interact over the data network 130 with the user accessing the interaction site.

The recommendation engine 196 is operable to present a recommendation to the developer of the content provider system 142 through the application builder interface 192. That is, the recommendation engine 196 is operable to provide the user (i.e., the developer) with a recommendation for a specific artifact or custom grammars file that the recommendation engine 196 has concluded is likely of interest to the developer based either on direct searches conducted by the developer, or inferences drawn from the developer's activities on the application development platform. Additionally, the recommendation engine 196 may provide the recommendation at a time of its own choosing that is deemed most appropriate for the specific artifact. For example, the recommendation engine 196 may provide a recommended interaction page for telling jokes to be linked between two interaction pages, if the recommendation engine 196 determines that a caller may have to wait a few minutes while the system performs the processing necessary to transition between the two interaction pages.

In some implementations, the recommendation engine 196 may determine the recommendation based on the developer's profile data stored in the application builder 190. In some implementations, based on the interactions, the recommendation engine 196 may update the developer's profile data in the application builder 190 or in the contact center configuration data store 162. In some implementations, the recommendation engine 196 may determine the recommendation based on data provided by the application configuration system 178 of the contact center builder 170.

The contact center configuration data store 162 is configured to store configuration data of contact centers. The configuration data can be any data associated with a contact center. For example, the configuration data may include a name of the contact center, contact information of the contact center, information of the content provider, information of the agent pool, or the location of the interaction site. In some implementations, the contact center builder 170 may access the contact center configuration data store 162 to access, edit, add, or remove contact center configuration data. In some implementations, an owner or an administrator of a contact center may access, edit, add, or remove the contact center configuration data.

The usage data store 160 is configured to store user interaction data with interaction sites. In some implementations, the usage data store 160 may store interaction data associated with a particular user. For example, the interaction data may include the gender and other characteristics of the user, the choices made by the user during each state of the interaction, and the resources utilized during each state of the interaction. In some implementations, the data store 160 may store aggregated interaction data associated with a particular interaction site. For example, the aggregated interaction data may include data specifying a breakdown of genders among all users that accessed the particular interaction site. In some implementations, a user may opt-out such that her usage data is then not stored in the usage data store 160. In some implementations, a user may opt-in to have her usage data be stored in the usage data store 160.

The application server 140 is configured to establish a data communications session with the communications device 110 and to receive and send data to the communications device 110 across the data network 130. The application server 140 also is configured to communicate with the call handling system 150 to send data received from the communications device 110 to the IVR 152. The application server 140 also may send other application-related data that did not originate from the communications device 110 to the IVR 152 or, more generally, to the multi-channel communications system 135. The application server 140 also is configured to communicate with the data store 160 to read and/or write user interaction data (e.g., state variables for a data communications session) in a shared memory space. The application server 140 may be one or more computer systems that operate separately or in concert under the direction of one or more software programs to perform the above-noted functions. In some implementations, the application server 140 and the call handling system 150 are a single integrated computer system.

In some implementations, one or more of the handling systems in the multi-channel communications system 135 may communicatively couple with the application server 140 and the data store 160 via the data network 130. For example, the user of the communications device 110 may download an application from the application server 140, and the downloaded application may include an add-on or plug-in, that, when invoked, enables the communications device 110 to automatically communicate with the multi-channel communications system 135 to access an interaction site.

FIGS. 2A-2H illustrate a GUI 200 for a contact center builder platform that enables development of a contact center for a content provider. In general, each contact center includes configuration parameters that enable a customer to reach an interaction site and perform a task either with or without a human agent. The configuration parameters of a contact center may include a contact center telephone number, agent configuration data, and the interaction site of the content provider. It may be a tedious process if the content provider is required to configure the contact center configuration parameters over several iterations with the service provider. The contact center builder interface 172 of the contact center builder 170 provides the content provider with a unified interface to create and configure the configuration parameters without the need to have the knowledge on how to configure an interaction site. With the unified interface, the content provider has access to a series of questions provided to obtain relevant specifications about the content provider's needs. After the content provider provides the specifications using the interface, the contact center builder 170 utilizes a backend process to configure the contact center according to the content provider's specifications. The GUI 200 may be implemented by the contact center builder interface 172 and presented to the content provider system 142 when the content provider system 142 accesses the contact center builder 170 using a web browser over the data network 130 to create/manage the contact center. The following describes the different components of the GUI 200 with respect to the system 100 that is described with reference to FIG. 1. Specifically, the components of the GUI 200 are described as used by the content provider system 142 to create a contact center for providing a variety of customer services for users associated with the content provider system 142. However, the GUI 200 and the associated contact center builder tool may be used by other systems, content providers or application developers to create any contact center to provide any desired service in response to a customer contact.

Figure 2A:
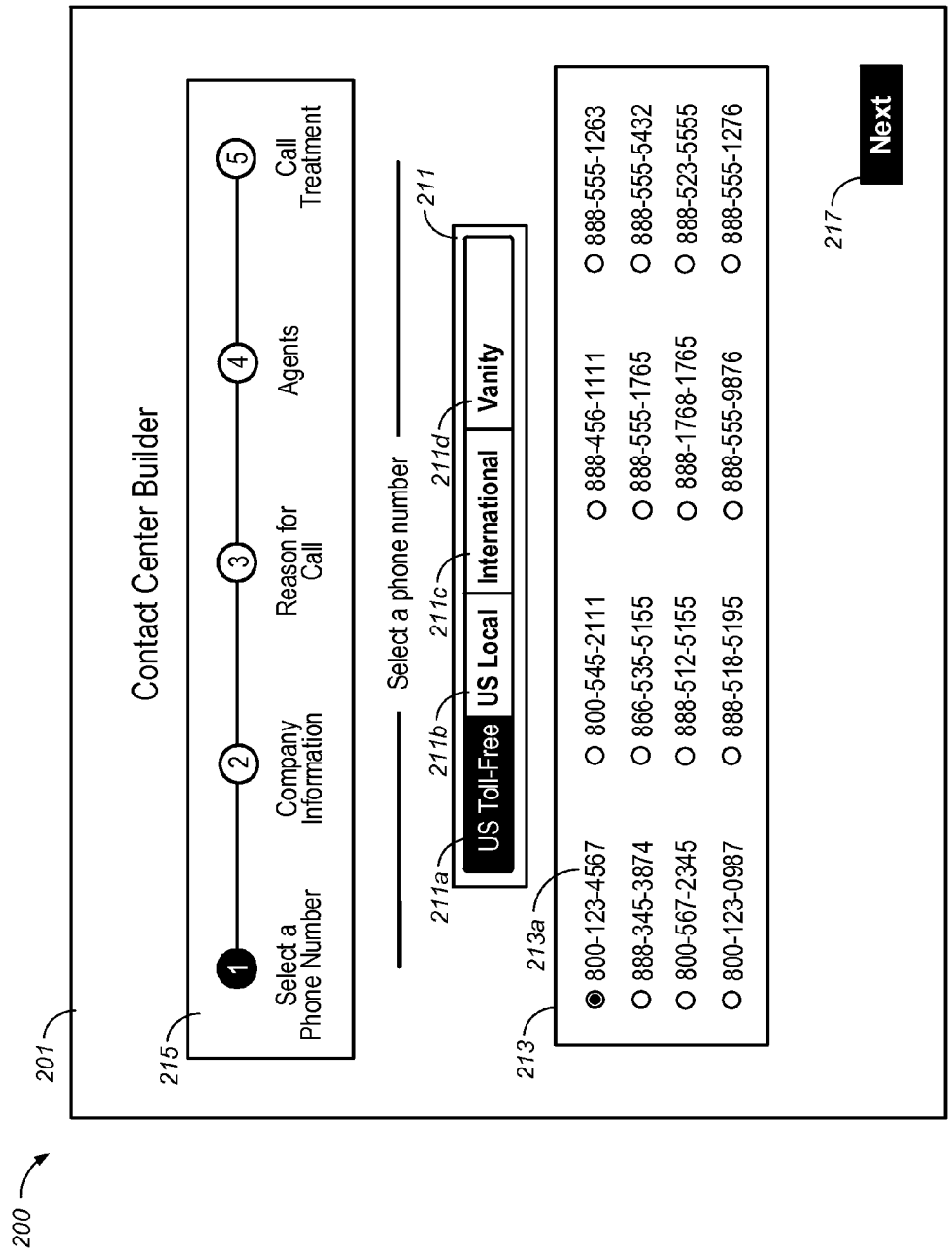
FIGS. 2A-2H illustrate a GUI for a contact center builder platform that enables development of a contact center for a content provider.

FIG. 2A illustrates an example GUI 201 for a contact center builder platform for selecting a telephone number for a contact center. The GUI 201 displays a status bar 215, a contact center specification section 211, and a telephone number selection section 213. The status bar 215 is configured to display the number of steps required to set up a contact center, and is also configured to show the step currently presented to the content provider. For example, the status bar 215 shows that the content provider is required to complete five steps to set up the contact center, and the GUI 201 presents a first step of "Select a Phone Number." Importantly, the number of steps described in this specification is an example and is not limiting, and the number of steps may change depending on different implementations of the contact center builder 170. For example, the third step of "Reason for Call" may be expanded into two or more steps depending on the implementation of the contact center builder 170. Moreover, the sequence of the GUI 200 as presented in FIGS. 2A-2H is not limiting and may change depending on different implementations. For example, the step of selecting a phone number for a contact center may be presented to a content provider either before or after the content provider provides information about the company.

The contact center specification section 211 enables the user of the content provider system 142 to select the type of telephone number to be associated with the contact center. As described above, prior to the contact center set up process, the service provider may work with multiple carriers to obtain and maintain a pool of telephone numbers that can be assigned to contact centers. The types of telephone numbers maintained by the service provider as illustrated in FIG. 2A include a U.S. Toll-Free number, a U.S. Local number, an international number, and a vanity number, which can be selected by the content provider by selecting one of the displayed tabs 211a, 211b, 211c, or 211d, respectively. In some implementations, after the content provider specifies the type of telephone number, the telephone number configuration system 174 may select one or more telephone numbers that satisfy the specification from the pool of telephone numbers maintained by the service provider. Here, the example GUI 201 illustrates that the user of the content provider system 142 has selected the "US Toll-Free" tab 211a, and the telephone number selection section 213 displays a number of available U.S. Toll-Free telephone numbers to the content provider for selection. In some implementations, the contact center specification section 211 may display a price associated with each available telephone number to help the user of the content provider system 142 select the appropriate telephone number.

Although not illustrated in FIG. 2A, in some implementations, if the user of the content provider system 142 selects the "US Local" tab 211b, the GUI 201 may ask the user of the content provider system 142 to provide the geographical information about the local contact center. Example geographical information includes a name of the state, a name of the city, or a zip code. The telephone number configuration system 174 may select one or more telephone numbers that satisfy the geographical information from the pool of telephone numbers maintained by the service provider and display the one or more telephone numbers on the telephone number selection section 213.

In some implementations, if the user of the content provider system 142 selects the "International" tab 211c, the GUI 201 may ask the user of the content provider system 142 to provide the geographical information about the international contact center. Example geographical information includes a name of the country, and a name of the city. The telephone number configuration system 174 may select one or more telephone numbers that satisfy the geographical information from the pool of telephone numbers maintained by the service provider and display the one or more telephone numbers on the telephone number selection section 213.

In some implementations, if the user of the content provider system 142 selects the "Vanity" tab 211d, the GUI 201 may ask the user of the content provider system 142 to provide additional information about the vanity telephone number. For example, the content provider may wish to obtain a vanity telephone number of "1-800-example." The telephone number configuration system 174 may select one or more telephone numbers that satisfy the additional information from the pool of telephone numbers maintained by the service provider and display the one or more telephone numbers on the telephone number selection section 213. If no telephone number satisfies the additional information, the telephone number configuration system 174 may recommend one or more available telephone numbers, or ask the user of the content provider system 142 to try another vanity telephone number.

After the user of the content provider system 142 selects a telephone number displayed on the telephone number selection section 213, the user of the content provider system 142 may click on the "Next" button 217 to move to the next step. After the user of the content provider system 142 clicks on the "Next" button 217, the telephone number configuration system 174 assigns the selected telephone number to the contact center of the content provider system 142. In some implementations, the contact center builder 170 stores the assigned telephone number of the contact center as contact center configuration data in the contact center configuration data store 162. In some implementations, the application configuration system 178 uses the assigned telephone number to generate an interaction site for the contact center. Although not shown here, in some implementations, the contact center builder interface 172 may present one or more GUIs to the user of the content provider system 142 to set up a contact center SMS number, a contact center e-mail address, and/or a contact center chat room website using implementations similar to the descriptions of FIG. 2A.

Figure 2B:
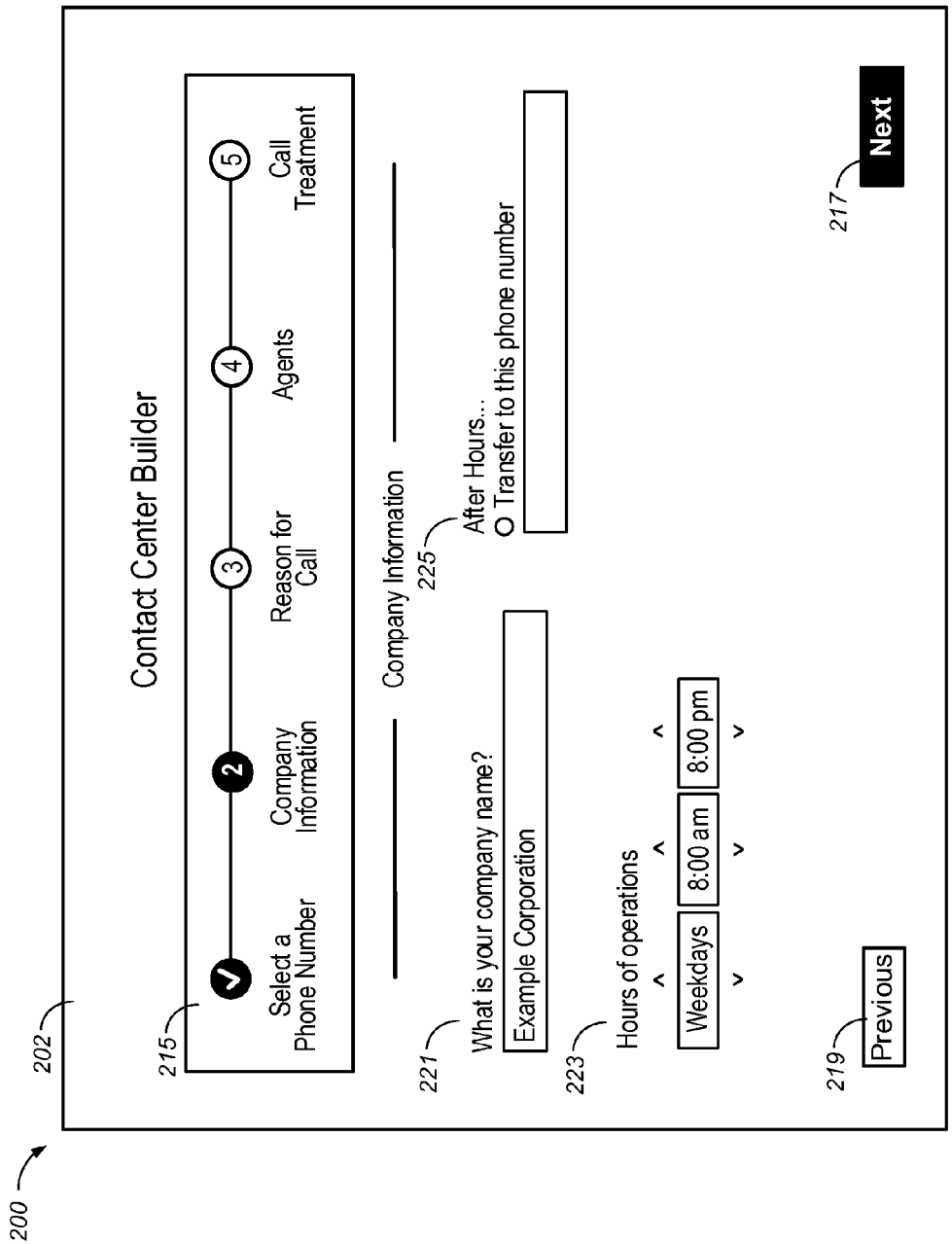

FIG. 2B illustrates an example GUI 202 for contact center builder platform for specifying company information of the content provider. As indicated by the shaded areas, the status bar 215 shows that the GUI 202 is the second step of the contact center set up process. Here, the GUI 202 includes a company-name field 221, an hours-of-operations field 223, and an after-hours-contact field 225, which enables the user of the content provider system 142 to provide corresponding data accordingly. After the user of the content provider system 142 completes the company information, the user of the content provider system 142 may click on the "Next" button 217 to move to the next step. If the user of the content provider system 142 wishes to return to the previous GUI 201, the user of the content provider system 142 may click on the "Previous" button 219. In some implementations, after the user of the content provider system 142 clicks on the "Next" button 217, the contact center builder 170 may store the company information as contact center configuration data in the contact center configuration data store 162. In some implementations, the application configuration system 178 uses the company information to generate one or more interaction pages for the interaction site of the contact center. As described in FIGS. 3A and 3B below, in some implementations, the contact center builder 170 may use the company information to customize one or more subsequent steps in the contact center set up process. For example, the contact center builder 170 may use the name of company to recommend one or more tasks that can be performed without a human agent. Note that the company information collected by the contact center builder 170 using the GUI 202 as described in this specification is not limiting, as the contact center builder 170 may require less or more company information to set up a contact center depending on different implementations.

Figure 2C:
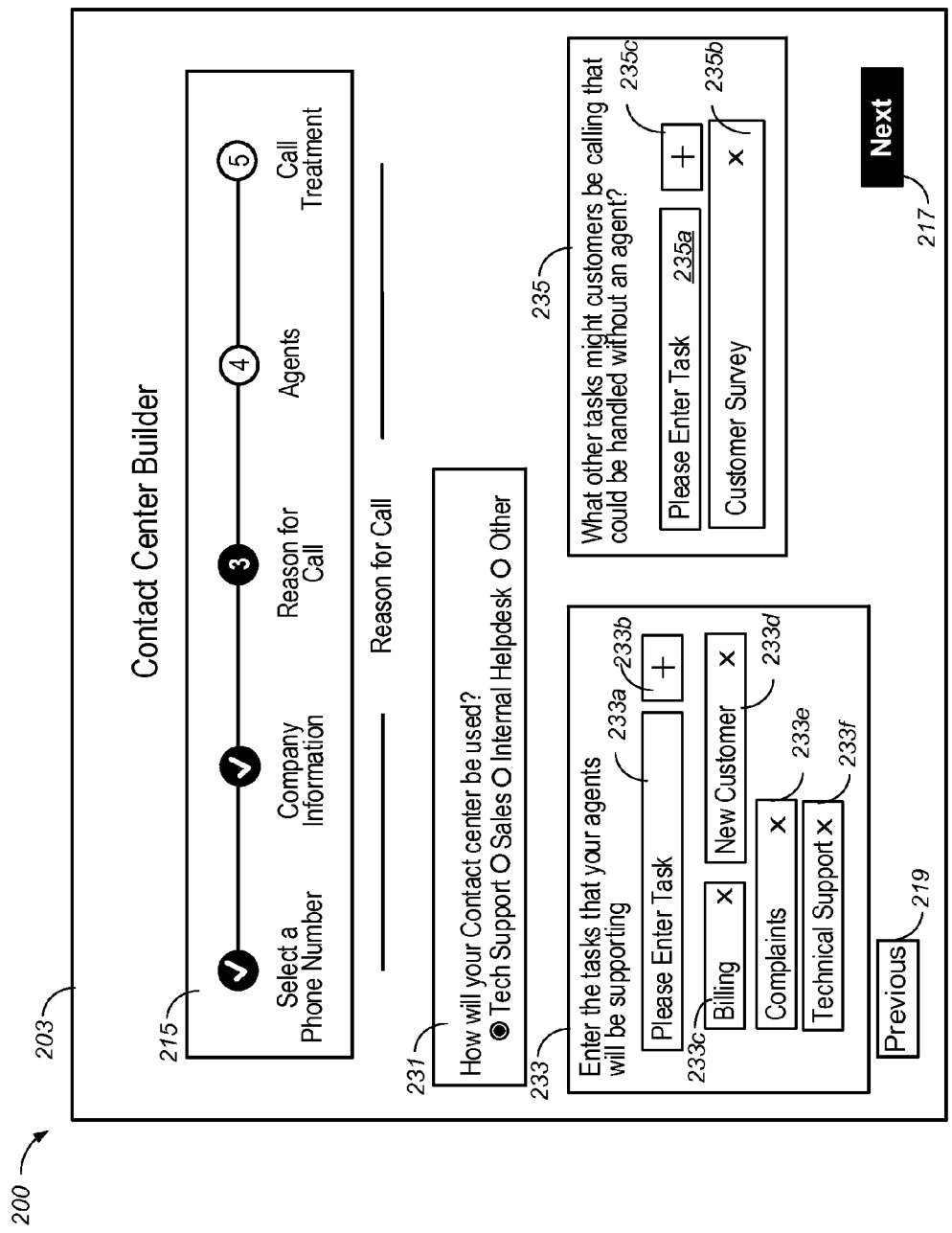

FIG. 2C illustrates an example GUI 203 for contact center builder platform for specifying the reasons for calls of the contact center. In general, the GUI 203 enables a content provider to specify the purpose of the contact center, as well as tasks to be supported by human agents and/or tasks to be handled using an IVR system without a human agent. As indicated by the shaded areas, the status bar 215 shows that the GUI 203 is the third step of the contact center set up process. The GUI 203 includes a category section 231, a tasks-with-agent section 233, and a tasks-without-agent section 235. Note that the data collected by the contact center builder 170 using the GUI 203 as described in this specification is not limiting, as the contact center builder 170 may require less or more data to determine the reasons for calls depending on different implementations. Moreover, as described in FIGS. 3A and 3B below, in some implementations, the contact center builder 170 may present more or fewer information to the user of the content provider system 142 depending on one or more attributes associated with the content provider. For example, the GUI 203 may display different category selections in the category section 231 to two different content providers in two different industries.

The category section 231 enables the user of the content provider system 142 to specify how the contact center is to be used. Here, the GUI 203 presents four categories, "Tech Support," "Sales," "Internal Helpdesk," and "Others," to the user of the content provider system 142. In some implementations, the user of the content provider system 142 may select one or more categories of the presented categories. In some implementations, the contact center builder 170 stores the selected category as contact center configuration data in the contact center configuration data store 162. In some implementations, the application configuration system 178 uses the selected category when generating an interaction site for the contact center. For example, the configuration system 178 may use the selected category as a filter to identify interaction sites and/or interaction pages of existing contact centers with the same category.

The tasks-with-agent section 233 enables the user of the content provider system 142 to specify a list of tasks to be supported by human agents. The GUI 203 allows the user of the content provider system 142 to enter the name of the task using the text field 233a, and to use the "+" button 233b to add the task to the tasks-with-agent section 233. Here, four tasks 233c-233f, "Billing," "New Customer," "Complaints," and "Technical Support," have been added by the user of the content provider system 142 as tasks to be supported by human agents. The user of the content provider system 142 may remove any one of the added tasks 233c-233f by clicking on the "x" symbol displayed next to the tasks. In some implementations, as described in FIGS. 2D-2F below, the agent configuration system 176 uses the tasks as agent skills for configuring the agents of the contact center. In some implementations, the contact center builder 170 stores the added tasks as contact center configuration data in the contact center configuration data store 162. In some implementations, the application configuration system 178 uses the added tasks to generate one or more interaction pages of the interaction site for the contact center.

The tasks-without-agent section 235 enables the user of the content provider system 142 to specify a list of tasks to be supported without a human agent. In some implementations, the tasks to be supported without a human agent may be supported by an IVR system 152 of the call handling system 150 using an automated multi-step voice interaction. The GUI 203 allows the user of the content provider system 142 to enter the name of the task using the text field 235a, and to use the "+" button 235b to add the task to be handled without an agent to the tasks-without-agent section 235. Here, one task 235b, "Customer Survey," has been added by the user of the content provider system 142 as tasks to be supported without human agents. The user of the content provider system 142 may remove the added task 235b by clicking on the "x" symbol displayed next to the task. In some implementations, the contact center builder 170 stores the added tasks as contact center configuration data in the contact center configuration data store 162. In some implementations, the application configuration system 178 uses the added tasks to generate one or more interaction pages of the interaction site for the contact center. After the user of the content provider system 142 completes the reasons for calls, the user of the content provider system 142 may click on the "Next" button 217 to move to the next step. If the user of the content provider system 142 wishes to return to the previous GUI 202, the user of the content provider system 142 may click on the "Previous" button 219.

Figure 2D:
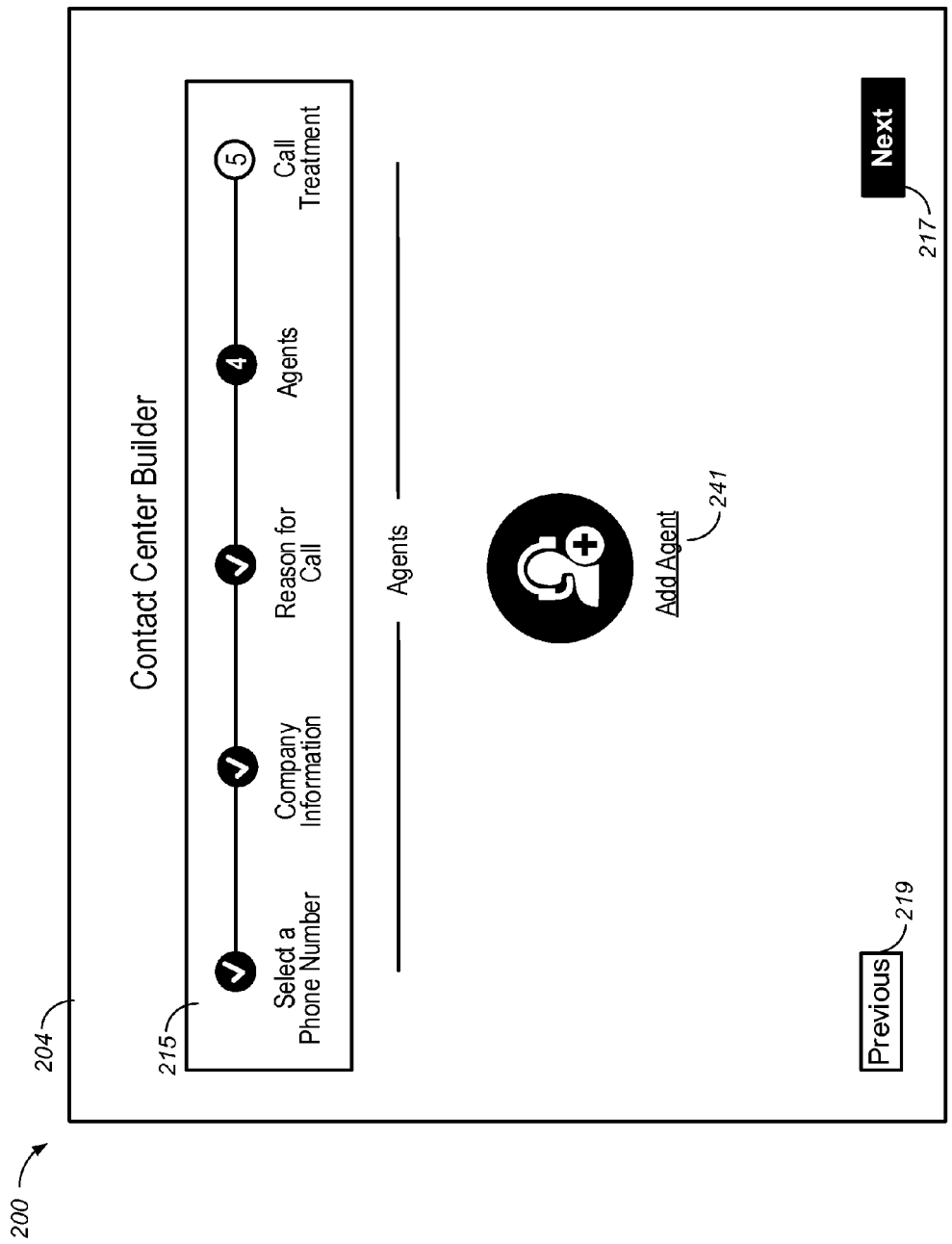
Figure 2E:
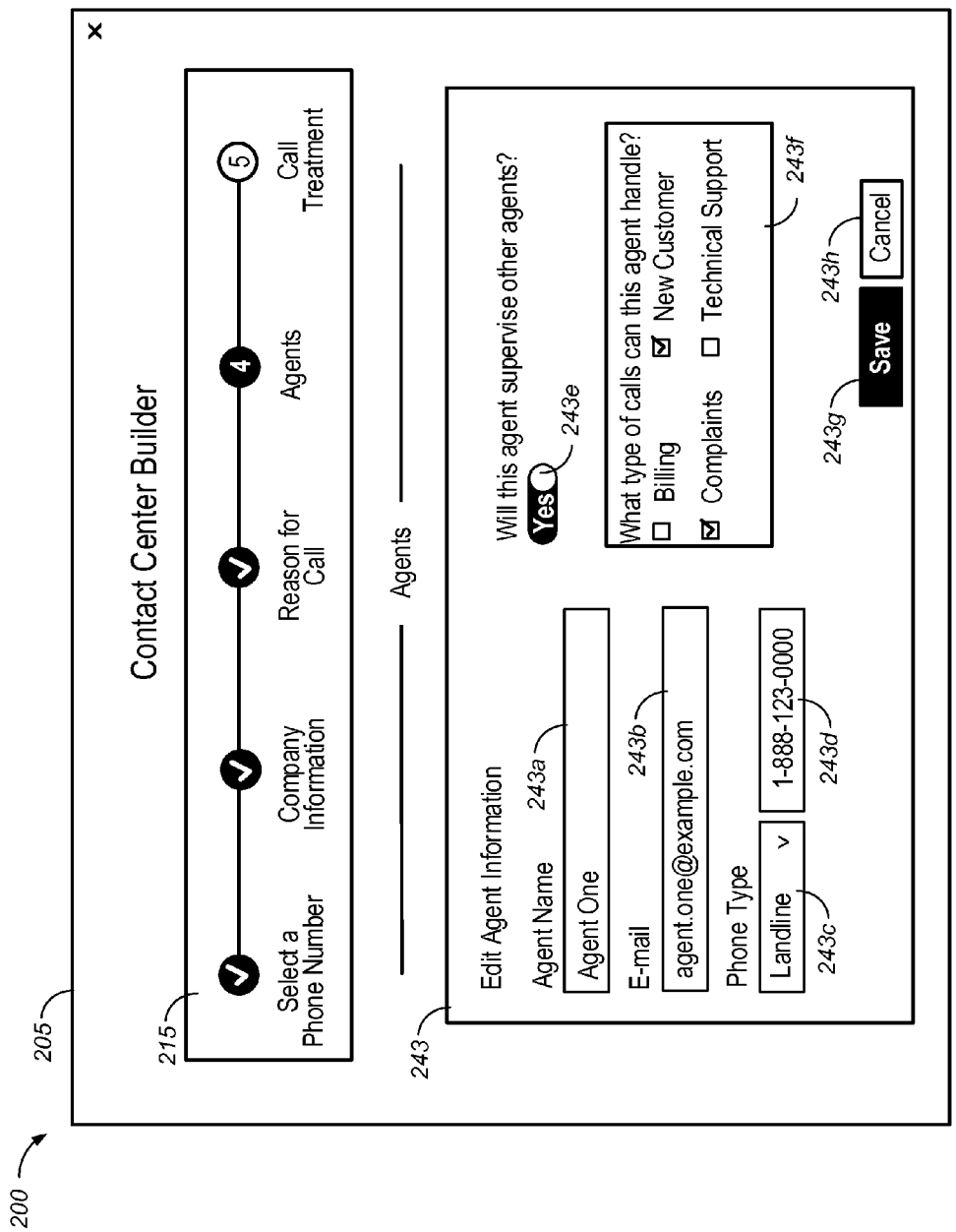
Figure 2F:
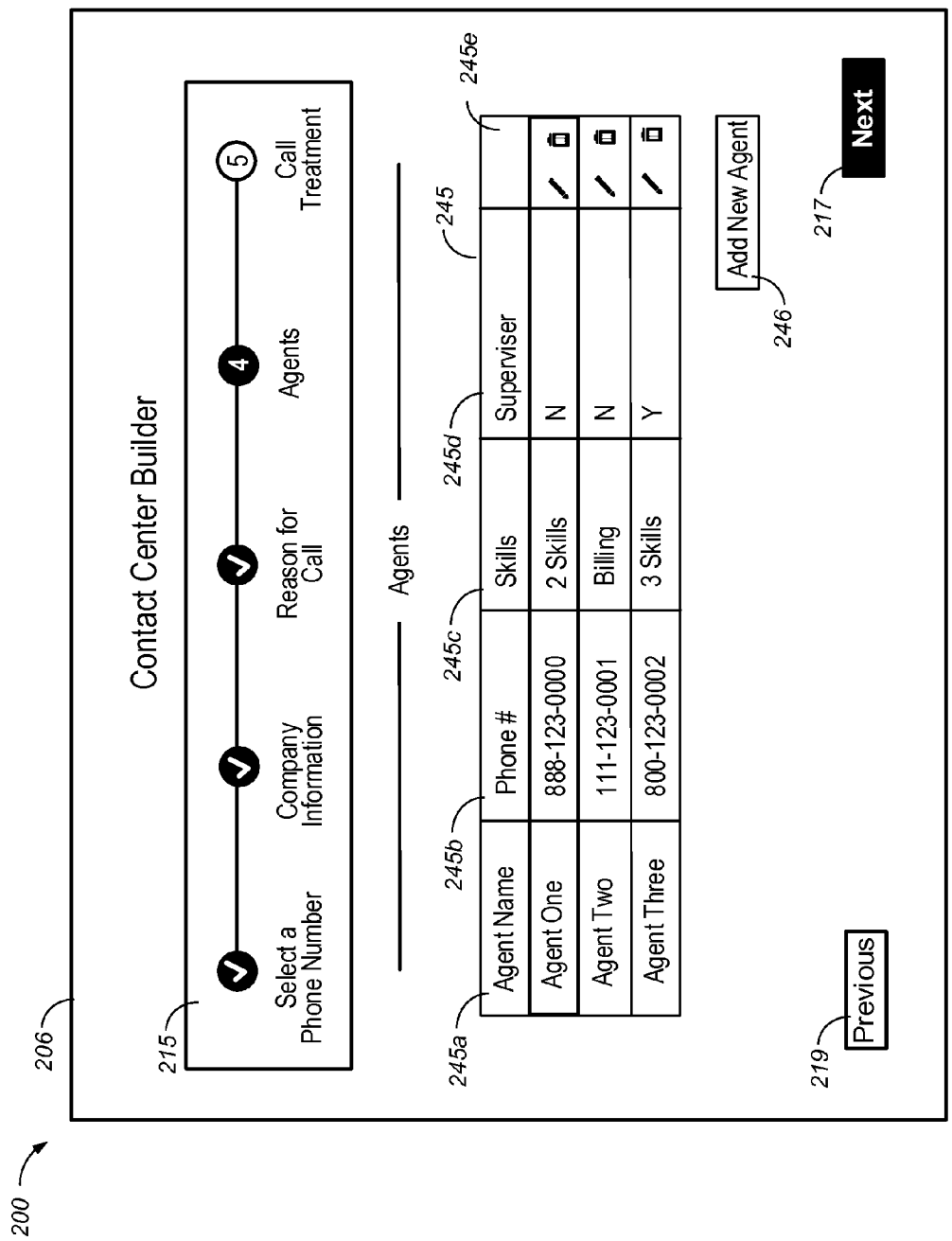

FIGS. 2D-2F illustrate example GUIs 204, 205, and 206 for contact center builder platform for specifying the agents of the contact center. In general, the GUIs 204, 205, and 206 enable a content provider to specify the agents of the contact center, as well as one or more skills associated with each agent. Note that the number of GUIs described here is not limiting, and a different number of GUIs may be presented to a user of a content provider system depending on different implementations. Referring to FIG. 2D, as indicated by the shaded areas, the status bar 215 shows that the GUI 204 is the fourth step of the contact center set up process. The GUI 204 includes an "Add Agent" link 241. The user of the content provider system 142 may click on the "Add Agent" link 241 to reach to the GUI 205 of FIG. 2E if the user of the content provider system 142 wishes to add one or more agents to the contact center. If the user of the content provider system 142 does not wish to add any agent to the contact center, the user of the content provider system 142 may click on the "Next" button 217 to move to the next step. If the user of the content provider system 142 wishes to return to the previous GUI 203, the user of the content provider system 142 may click on the "Previous" button 219.

Referring to FIG. 2E, the GUI 205 includes an agent specification section 243. The agent specification section 243 enables the user of the content provider system 142 to enter agent information. For example, the agent information may include a name of the agent 243a, an e-mail contact of the agent 243b, a telephone type of the agent 243c, and a telephone number of the agent 243d. In some implementations, the agent specification section 243 may allow the user of the content provider system 142 to specify whether the agent is a supervisor by clicking on the "Yes" radio button 243e. Although not shown in FIG. 2E, in some implementations, the agent specification section 243 may allow the user of the content provider system 142 to specify information of a supervisor that is not an agent.

The agent specification section 243 may further include an agent-skills section 243f. In some implementations, the agent-skills section 243f may include the tasks specified by the user of the content provider system 142 as to be handled by human agents. For example, the GUI 205 shows the agent-skills section 243f including four tasks, "Billing," "New Customer," "Complaints," and "Technical Support," that were specified by the content provider as tasks to be handled by human agents in FIG. 2C. The user of the content provider system 142 may assign one or more tasks to an agent as skills of the agent, by clicking on the checkbox associated with the respective task. Here, the user of the content provider system 142 has specified that Agent One has an e-mail address of "agent.one@example.com," a telephone type of "Landline," a telephone number of "1-888-123-0000," and skills of handling tasks of "New Customer" and "Complaints." In addition, the user of the content provider system 142 has specified that Agent One is not a supervisor of other agents. After the user of the content provider system 142 completes the agent information for Agent One, the user of the content provider system 142 may click on the "Save" button 243g to add the agent to the agent pool. If the user of the content provider system 142 wishes to cancel the agent information for Agent One, the user of the content provider system 142 may click on the "Cancel" button 243h to cancel the configuration of the agent information. Note that the agent information collected by the contact center builder 170 using the GUI 205 as described in this specification is not limiting, as the contact center builder 170 may require less or more agent information to set up a contact center depending on different implementations.

Referring to FIG. 2F, the GUI 206 includes a summary of agents in the agent pool of the contact center. In some implementations, the user of the content provider system 142 may access the GUI 206 by either clicking the "Save" button 243g or the "Cancel" button 243h in GUI 205 in FIG. 2E. A table 245 summarizes the agents that have been added by the user of the content provider system 142 using GUI 205. For example, the table 245 displays a column 245a showing the names of the agents, a column 245b showing the respective telephone numbers of the agents, a column 245c showing the respective assigned skills of the agents, a column 245d showing the supervisory role of the agents, and a column 245e allowing the user of the content provider system 142 to edit or remove the agent from the agent pool. For example, the user of the content provider system 142 may edit a hierarchy of the agent supervisory roles by clicking on the pencil symbol in the column 245e. To add a new agent to the agent pool, the user of the content provider system 142 may click on the "Add New Agent" button 246. If the user of the content provider system 142 has completed the configuration of agents of the contact center, the user of the content provider system 142 may click on the "Next" button 217 to move to the next step. If the user of the content provider system 142 wishes to return to the GUI 203 of the previous step, the user of the content provider system 142 may click on the "Previous" button 219. In some implementations, the agent configuration system 176 may aggregate and manipulate the agent information, and store the agent information as contact center configuration data in the contact center configuration data store 162. In some implementations, the application configuration system 178 uses the added agent information to generate one or more interaction pages of the interaction site for the contact center.

Figure 2G:
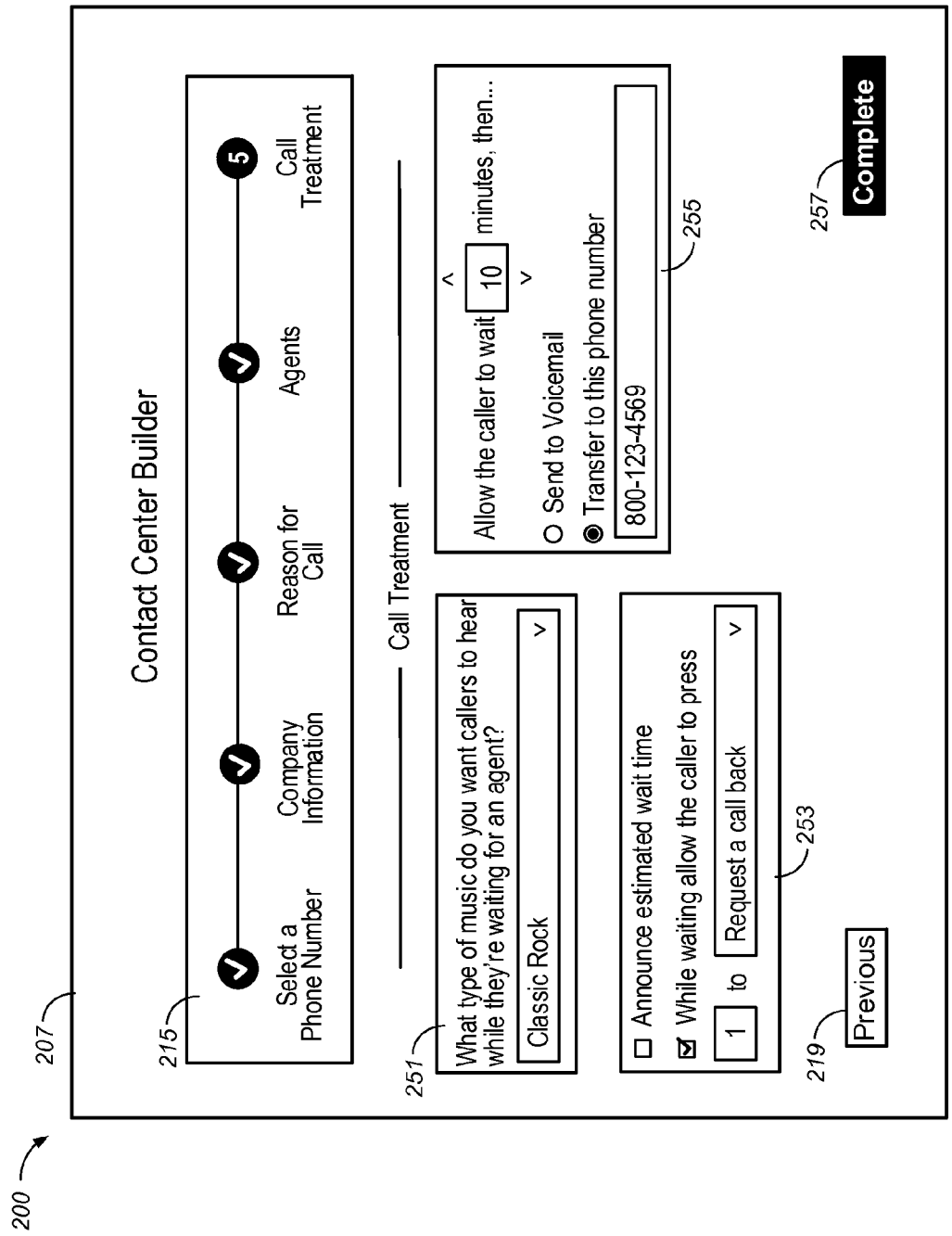

FIG. 2G illustrates an example GUI 207 for contact center builder platform for specifying the call treatment of the contact center. In general, the GUI 207 enables a content provider to specify call treatment parameters of the contact center that may further enhance the contact center experience for the users. The GUI 207 includes a music section 251, a wait-option section 253, and an overtime section 255. Note that the call treatment parameters collected by the contact center builder 170 using the GUI 207 as described in this specification is not limiting, as the contact center builder 170 may require less or more call treatment parameters to set up a contact center depending on different implementations.

As an example, the music section 251 enables the user of the content provider system 142 to use a drop-down menu to select the type of music to be offered to callers while they wait for an agent. The wait-option section 253 enables the user of the content provider system 142 to specify whether to announce the estimated wait time, and/or whether to offer the callers additional options to handle the calls while waiting. For example, the user of the content provider system 142 may offer the caller to request a call back by pressing "1" on the number pad of the communications device 110. The overtime section 255 enables the user of the content provider system 142 to specify the action to take after the wait time exceeds a threshold. For example, the user of the content provider system 142 may specify that after waiting for 10 minutes, the call is transferred to a telephone number "800-123-4569," which may be a dedicated line for processing delayed calls. In some implementations, the contact center builder 170 stores the call treatment parameters as contact center configuration data in the contact center configuration data store 162. In some implementations, the application configuration system 178 uses the call treatment parameters to generate one or more interaction pages of the interaction site for the contact center. If the user of the content provider system 142 has completed the configuration of call treatment options of the contact center, the user of the content provider system 142 may click on the "Complete" button 257 to move to the complete the contact center set up process. If the user of the content provider system 142 wishes to return to the GUI 206 of the previous step, the user of the content provider system 142 may click on the "Previous" button 219.

Figure 2H:
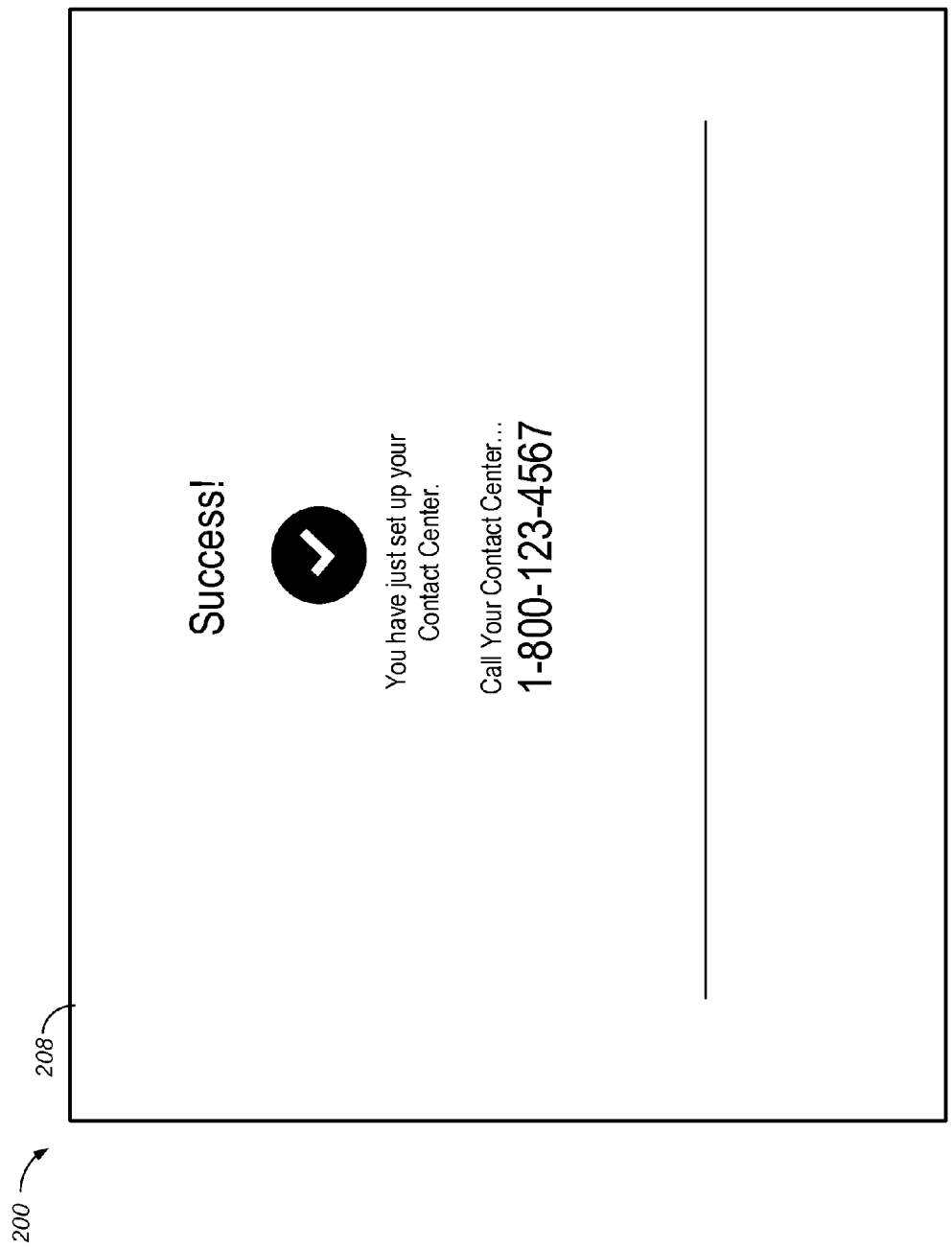

FIG. 2H illustrates an example GUI 208 for contact center builder platform for specifying the completion of the contact center set up process. The GUI 208 is displayed to the user of the content provider system 142 that the contact center set up process has completed, and the contact center may be accessed using the contact center telephone number assigned to the contact center in FIG. 2A. In some implementations, at the end of the contact center set up process, the contact center builder 170 generates the contact center for the user of the content provider system 142, including a contact center telephone number, an agent pool, and an interaction site. The contact center may be setup very quickly using this approach. For example, in some implementations, the contact center may be fully setup within a few minutes or less upon completion of the contact center setup process. In some implementations, the user of the content provider system 142 may test the contact center by dialing the contact center telephone number to initiate the interaction site generated by the contact center builder 170. For example, the user of the content provider system 142 may test the interaction site to ensure that the call is routed to the appropriate agent based on the service. The user of the content provider system 142 may edit the interaction site by initiating a web-based interaction with the application builder 190.

Figure 3A:
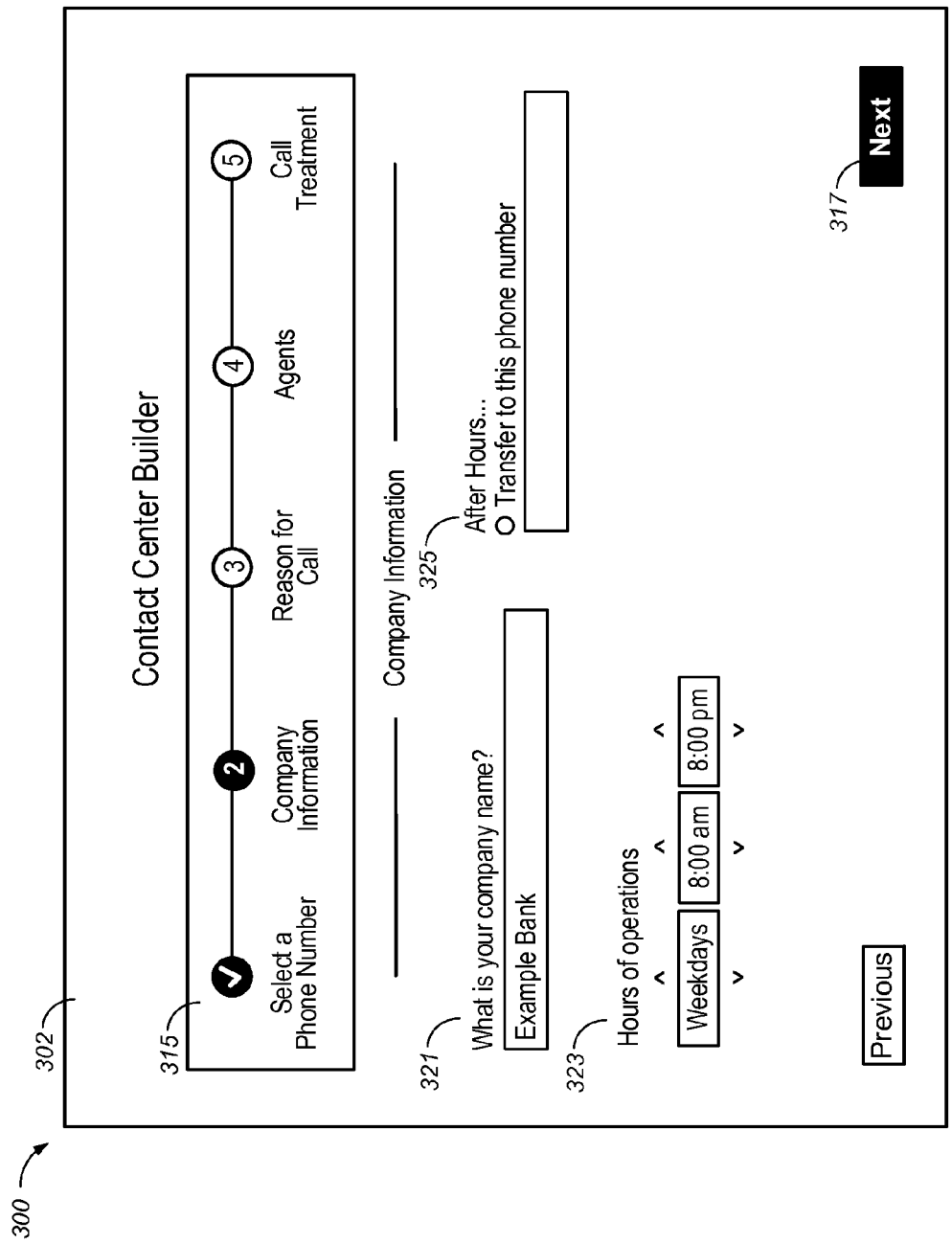
FIGS. 3A and 3B illustrate a GUI for a contact center builder platform that uses data of other contact centers for development of a contact center.
Figure 3B:
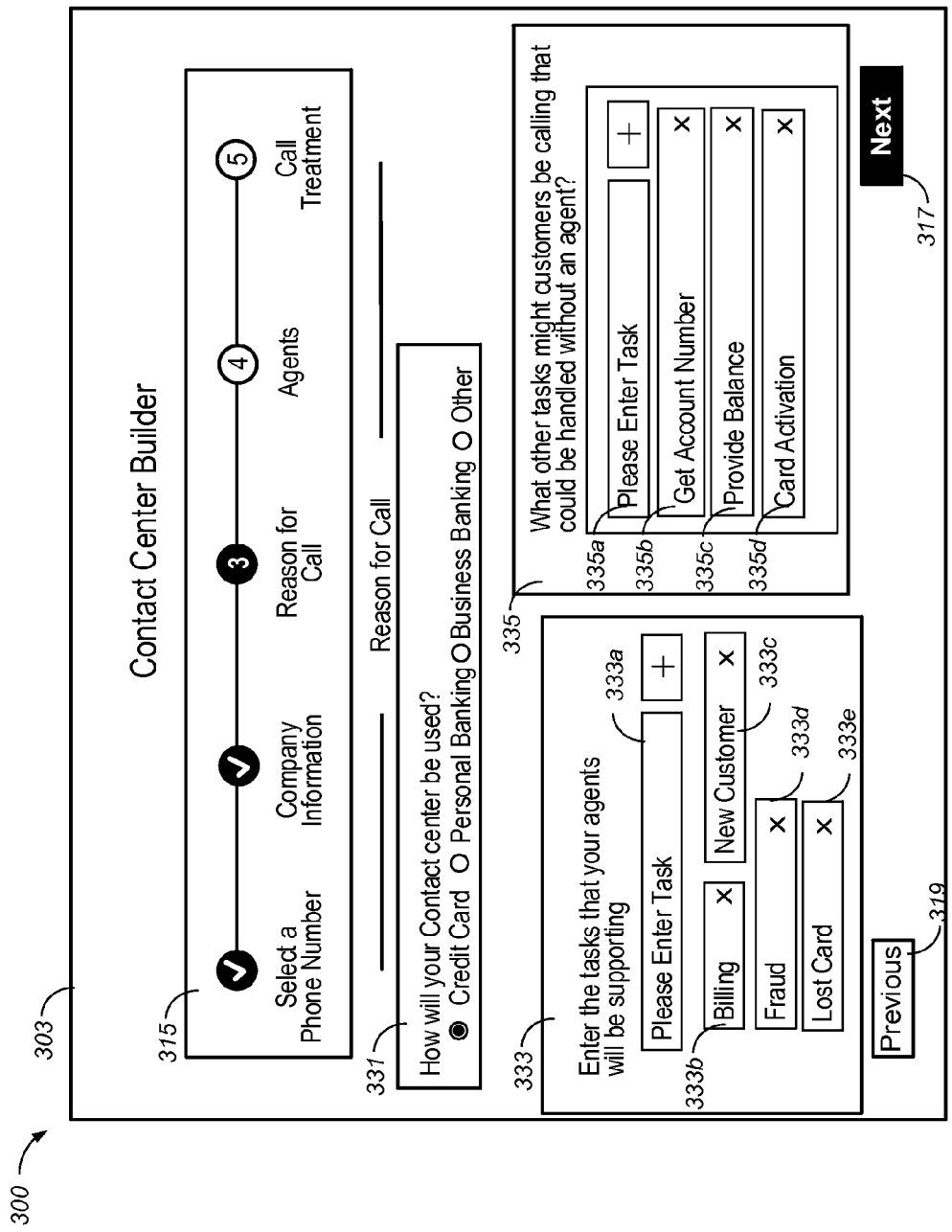

FIGS. 3A and 3B illustrate a GUI 300 for a contact center builder platform that uses data of other contact centers to provide recommendations for development of a contact center. In general, a contact center may be associated with multiple attributes. For example, a profile parameter of the content provider may be an attribute. For example, a content provider name of the contact center may be an attribute. As another example, an industry that a content provider is in may be an attribute. As another example, a task handled by the call center may be an attribute. As another example, a contact center telephone number may be an attribute. Multiple contact centers may share one or more common attributes, and these contact centers sharing the common attributes may often share common contact center configuration parameters. For example, many contact centers in the banking industry may support credit card billing as a task. As another example, many contact centers with vanity telephone numbers of "BUY-xxxx," where "x" is any numerical digit, may support sales as a task.

In a multi-tenant SaaS environment, where a service provider hosts contact centers for a large number of companies across different industries, the service provider may leverage its existing data of contact centers to help a content provider to set up a new contact center. In some implementations, the contact center builder 170 may recommend one or more configuration parameters based on an input parameter provided by the content provider. For example, based on the industry of the content provider, the contact center builder interface 172 may recommend one or more tasks commonly indicated by other contact centers in the same industry as to be handled with and/or without human agents. The recommendation may help shorten the development time, and may help provide the content provider with additional insights on what tasks can be handled without human agents. In addition, it is often advantageous if the contact center builder 170 may infer one or more attributes based on an input parameter provided by the content provider. For example, the contact center builder 170 may infer the industry of the content provider based on the name of the content provider. With the inference, the contact center builder interface 172 may present fewer questions to the content provider in the contact center set up process, and therefore may potentially shorten the set up time.

FIG. 3A illustrates an example GUI 302 for contact center builder platform for specifying company information of the content provider. The status bar 315 indicates that the GUI 302 is the second step of the contact center set up process. The GUI 302 is similar to the GUI 202 in FIG. 2B, where the GUI 302 includes a company-name field 321, an hours-of-operations field 323, and an after-hours-contact field 325. In this example, the user of the content provider system 142 enters the company name as "Example Bank" in the field 321, and clicks on the "Next" button 317 to access the next GUI. Based on the company name "Example Bank," the contact center builder 170 may infer that the content provider belongs to the banking industry. In some implementations, the contact center builder 170 may determine the inference using predetermined keywords. For example, the word "bank" may be a keyword that specifies the industry of the content provider. In some implementations, the contact center builder 170 may determine the inference by comparing the input data with configuration data of other contact centers stored in the contact center configuration data store 162. In some implementations, an inference can be determined based on semantic analysis of the input data with configuration data of other contact centers stored in the contact center configuration data store 162. The details of the semantic analysis are described in greater detail in U.S. patent application Ser. No. 14/327,476, which is incorporated herein by reference for all purposes. As an example, semantic distances between the name "Example Bank" and names of other contact centers may be calculated, and the name "Example Bank" may be clustered with names of one or more other contact centers according to the calculated semantic distances. Other attributes or configuration parameters of the one or more other contact centers may be identified from the contact center configuration data store 162, and the contact center builder 170 may recommend these attributes or configuration parameters to the user of the content provider system 142.

FIG. 3B illustrates an example GUI 203 for contact center builder platform for recommending the reasons for calls of the contact center. In some implementations, the contact center builder 170 may recommend one or more categories in the category section 331 of the GUI 303. For example, after determining that the content provider may be in the banking industry, the contact center builder 170 recommends categories of "Credit Card," "Personal Banking," "Business Banking," and "Other" to the user of the content provider system 142. These recommended categories are different from the default categories of "Tech Support," "Sales," "Internal Helpdesk," and "Others," as illustrated in FIG. 2C.

In some implementations, the contact center builder 170 may recommend one or more tasks to be performed by human agents in the task-with-agent section 333 of the GUI 303. For example, after determining that the content provider may be in the banking industry, the contact center builder 170 recommends tasks 333b-333e of "Billing," "New Customer," "Fraud," and "Lost Card" to the user of the content provider system 142 without input from the user of the content provider system 142. The user of the content provider system 142 may add new tasks using field 333a. The user of the content provider system 142 may remove one or more of the recommended tasks 333b-333e by clicking on the "x" sign associated with the respective task.

In some implementations, the contact center builder 170 may recommend one or more tasks to be performed without a human agent in the task-without-agent section 335 of the GUI 303. For example, after determining that the content provider may be in the banking industry, the contact center builder 170 recommends tasks 335b-335d of "Get Account Number," "Provide Balance," and "Card Activation" to the user of the content provider system 142 without input from the user of the content provider system 142. The user of the content provider system 142 may add new tasks using field 335*a*. The user of the content provider system 142 may remove one or more of the recommended tasks 335*b*-335*d* by clicking on the "x" sign associated with the respective task. In some implementations, one or more interaction pages for each of the recommended tasks 335*b*-335*d* have already been developed for the other contact centers. Therefore the contact center development time for the user of the content provider system 142 may be shortened.

Figure 4A:
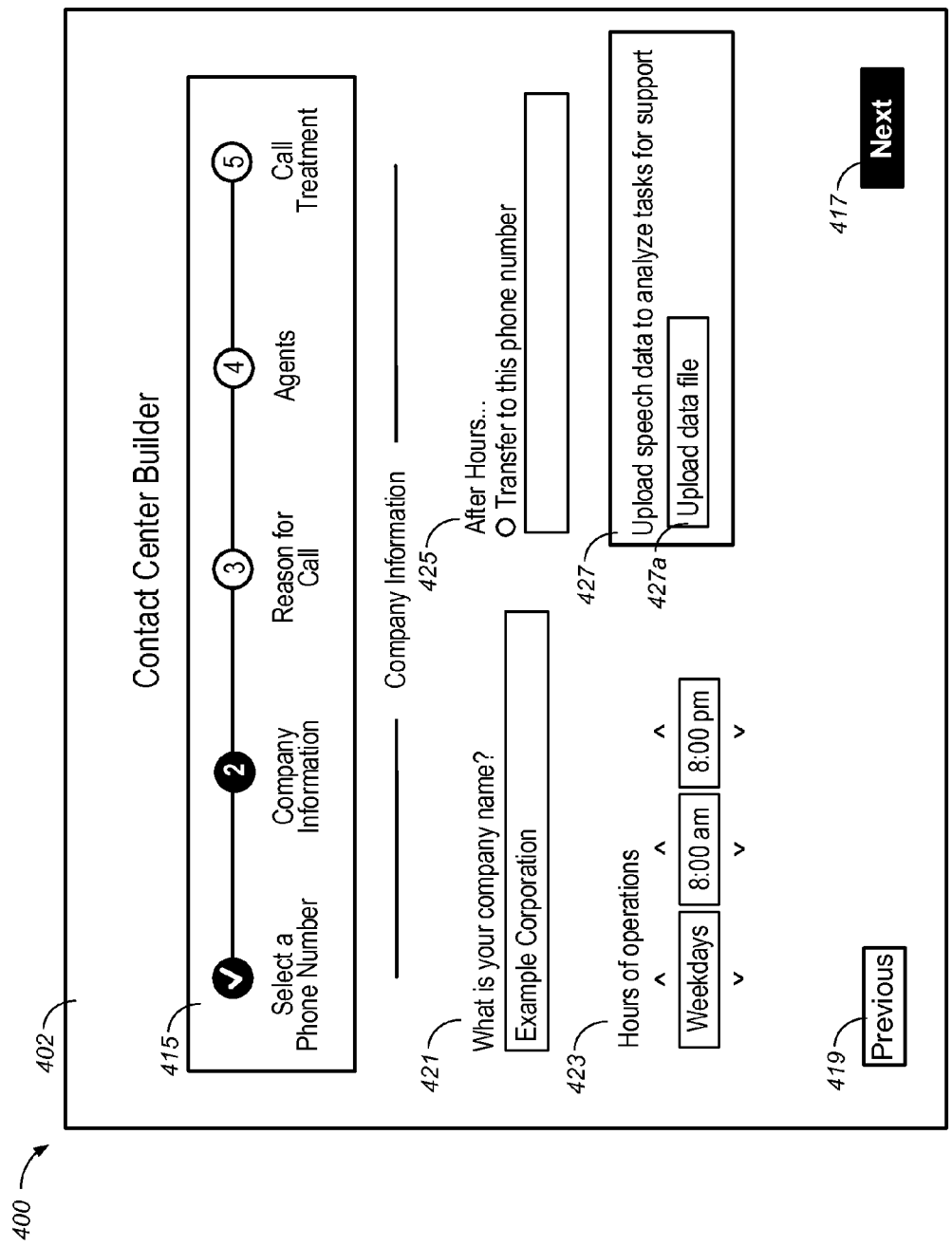
FIGS. 4A and 4B illustrate a GUI for a contact center builder platform that uses customer data for development of a contact center.
Figure 4B:
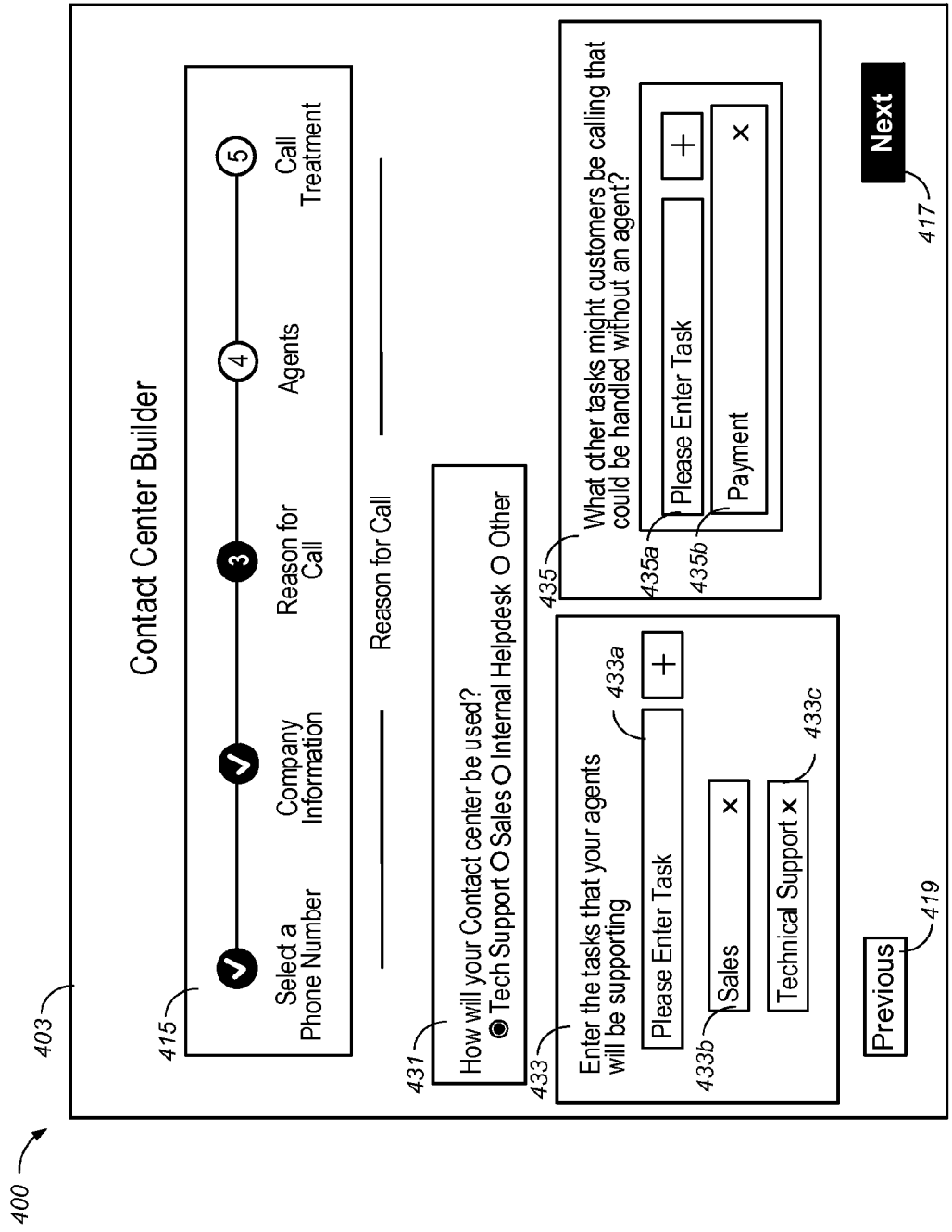

FIGS. 4A and 4B illustrate a GUI 400 for a contact center builder platform that uses customer data of the content provider to provide recommendations for development of a contact center. In general, the content provider may obtain customer data prior to setting up a contact center. For example, the content provider may have recorded telephone calls with its customers over a period of time prior to setting up a contact center with the service provider. The customer data may be helpful in determining the tasks that are commonly handled by the content provider.

FIG. 4A illustrates an example GUI 402 for contact center builder platform for specifying company information of the content provider. The GUI 402 is similar to the GUI 202 in FIG. 2B, where the GUI 402 includes a company-name field 421, an hours-of-operations field 423, and an after-hours-contact field 425. In addition, the GUI 402 includes a speech-upload section 427 for uploading customer data. The content provider may click on the "Upload data file" button 427*a* to select and upload the customer data. In some implementations, the customer data may be speech data. In some implementations, the customer data may be text data that is transcribed from speech data or it can be transcriptions of chat sessions. After the customer data has been uploaded, the user of the content provider system 142 may click on the "Next" button 417 to analyze the uploaded data.

The customer data may be analyzed using any known techniques. In some implementations, the customer data may be analyzed using semantic and statistical analysis, as are described in greater detail in U.S. atent application Ser. No. 14/327,476 which is incorporated herein by reference for all purposes. As an example, the customer data may be recorded telephone conversations with multiple customers over a period of time. Each of the recorded telephone conversation may be fragmented into pieces of speech fragments. For example, each conversation may be fragmented into two-word speech fragments. In some implementations, similar speech fragments extracted from the recorded telephone conversations may be clustered together based on semantic and statistical similarity and co-occurrence, and a number of occurrences may be analyzed. For example, if speech fragments "process payment," "payment arrangement," and "payment plan" occurs many times in the recorded telephone conversations, the contact center builder 170 may classify the speech fragments as "payment" and determine to recommend "payment" as a task for the contact center to the user of the content provider system 142.

In some implementations, the contact center builder 170 may further determine whether the recommended task is a task to be handled with or without a human agent. For example, using data stored in the contact center configuration data store, the contact center builder 170 may determine that a majority of contact centers handle the task "payment" without using an agent. In response to determining that a majority of contact centers handle the task "payment" without using an agent, the contact center builder 170 may determine that the recommended task of "payment" is a task to be handled without a human agent.

FIG. 4B illustrates an example GUI 403 for contact center builder platform for recommending the reasons for calls of the contact center. Although not shown here, in some implementations, the contact center builder 170 may recommend one or more categories in the category section 431 of the GUI 403. In some implementations, the contact center builder 170 may recommend one or more tasks to be performed by human agents in the task-with-agent section 433 of the GUI 403. For example, after analyzing the customer data of the content provider, the contact center builder 170 recommends tasks 433*b*-433*c* of "Sales" and "Technical Support" to the user of the content provider system 142 without input from the user of the content provider system 142. The user of the content provider system 142 may add new tasks using field 433*a*. The user of the content provider system 142 may remove one or more of the recommended tasks 433*b*-433*c* by clicking on the "x" sign associated with the respective task.

In some implementations, the contact center builder 170 may recommend one or more tasks to be performed without a human agent in the task-without-agent section 435 of the GUI 303. For example, after analyzing the customer data of the content provider and analyzing the contact center configuration data of other contact centers, the contact center builder 170 recommends task 435*b* of "Payment" to the user of the content provider system 142 without input from the user of the content provider system 142. The user of the content provider system 142 may add new tasks using field 435*a*. The user of the content provider system 142 may remove one or more of the recommended task 435*b* by clicking on the "x" sign associated with the respective task. In some implementations, one or more interaction pages for the recommended task 435*b* have already been developed for the other contact centers. Therefore the contact center development time for the user of the content provider system 142 may be shortened.

FIGS. 5A-5C illustrate a GUI 500 for an application development platform used by a content provider to view and modify an interaction site generated by the contact center builder 170. The GUI 500 may be implemented by the application builder interface 192 and presented to the user of the content provider system 142 when the user of the content provider system 142 accesses the application builder 190 using a web browser over the data network 130 to create/manage the interaction site. The following describes the different components of the GUI 500 with respect to the system 100 that is described with reference to FIG. 1. Specifically, the components of the GUI 500 are described as used by the user of the content provider system 142 to view an interaction site generated by the contact center builder 170 at the end of the contact center set up process. However, the GUI 500 and the associated application development tool may be used by other systems, content providers or application developers to create any interaction site to perform any desired automated interaction flow in response to a customer contact. Example implementations of an application builder platform are described in further detail in pending application Ser. No. 14/193,407, which is incorporated herein by reference for all purposes.

FIG. 5A illustrates an example GUI of an interaction site overview page 501 that may be presented to the content provider, for example, after the application configuration system 178 of the contact center builder 170 has generated the interaction site for the contact center of the content provider as described in FIGS. 2A-2H. The Site Overview page 501 provides a listing of interaction pages associated with this interaction site generated by the contact center builder 170. The name of the interaction site is specified in the heading 501b of the Site Overview page 401 (e.g., "Interaction Site").

When the user of the communications device 110 interacts with the interaction site, the first page that is processed is identified in the "Home Page" field 501c. The content provider may specify any page that the content provider wants to be processed first as the Home Page 501c. In some implementations, the first page in the listing of pages is the same page that is listed as the "Home Page" 501c. However, in other implementations, the page that is as the "Home Page" 501c is not the first page in the listing of the pages in the Site Overview page 501.

The order in which the various pages are processed is determined by the links in the respective pages. Each page usually contains a link to the next page that is to be processed. For example, the interaction site illustrated in the Site Overview page 501 has an interaction flow 502 of nine interaction pages, including the interaction pages "Welcome Message", "Billing", "Complaints", "New Customer", "Technical Support", "Survey", "Voicemail", "End Call", and "Call Log". Each of the pages may be identified by a page name that is shown in the Page Name field 501d. In addition or as an alternative to the page name, each page also may be identified by a page number that is shown in the Page # field 501e. The page name and page number of a page are specified by the content provider when creating the pages for the interaction site. A page may have a unique page name, or it may have a page name that is similar to the page name of another page. In case two or more pages share the same page name, they may be differentiated based on the page numbers. The combination of page name and page number uniquely identifies a page. A user may access and modify any of the pages displayed in the interaction flow 502 by selecting them from the displayed list.

A second page that is processed after the processing of a first page may be said to be directly linked to that first page if the first page includes a direct link to the second page without any intervening pages therebetween. Alternatively, a second page may instead be said to be indirectly linked to the first page if that first page is linked to the second page in the interaction flow with one or more pages being processed between the processing of the first page and the processing of the second page.

The content provider may create a new page by clicking the "Add Page" button icon 501f. When the "Add Page" button icon 501f is clicked, a new page is added to the interaction flow 502. In response to selecting the button icon 501f, the GUI 500 may present a set of page templates for selection in, for example, a drop-down list. The page templates may include, for example, message pages, question pages, logic pages, transaction pages, and multimodal action pages. The user may select a page template from the list to generate a page of the corresponding type using the template. The template presents to the user the necessary fields and/or controls for that page type and the user may populate the fields (e.g., by typing text into the fields) and/or select the controls to generate a page of the corresponding type.

Alternatively, a new page may be created by copying a previously created page. The content provider may select the page to be copied by checking the checkbox to the left of the page to be copied and then selecting the "Copy" button. An existing page can be deleted by checking the checkbox to the left of the page, and then clicking the "Delete" button. The content provider may save the interaction site by clicking the "Save" button 501j. The content provider may save the interaction site and then exit the GUI 501 by clicking the "Save & Exit" button 501g. The content provider may exit the GUI 401 without saving the interaction site by clicking the "Exit" button 501h. The content provider may compile the interaction site by clicking the "Compile" button 501i, where the application compiler 194 may compile the input parameters into an interaction flow document, and may save the interaction flow document in the interaction flow document database 185.

The Contact section 505 lists the contact information associated with each of the multiple channels for the interaction site "Interaction Site". The contact information specified in the Contact section 505 corresponds to the contact information configured by the content provider using the contact center builder 170. For example, a user may access the interaction site via a voice channel by calling the number "1-800-123-4567," as previously described in FIG. 2A. Although not described in FIGS. 2A-2H, alternatively, the user may access the interaction site via a SMS channel by sending a text message with the short code "12345" and the keyword "angel." Alternatively, the user may access the interaction site via a Chat channel by accessing the URL "www.example.com/chat." Alternatively, the user may access the interaction site via an E-mail channel by sending an e-mail to the address "support@example.com." The "Assign Contact" link 505 allows the content provider to revise the contact information for an interaction site.

Importantly, several interaction pages of this interaction site correspond to tasks specified in the contact center builder 170 as to be handled with human agents. For example, the application configuration system 178 has generated interaction pages 507a-507d corresponding to tasks of "Billing", "Complaints", "New Customer", and "Technical Support" as described in FIG. 2C. Moreover, an interaction page of this interaction site corresponds to a task specified in the contact center builder 170 as to be handled without human agents. For example, the application configuration system 178 has generated an interaction page 508a corresponding to the task of "Survey" as described in FIG. 2C. In addition, an interaction page of this interaction site corresponds to a call treatment specified in the contact center builder 170. For example, the application configuration system 178 has generated an interaction page 509a "Voicemail" corresponding to the call treatment of "Request a call back" as described in FIG. 2G.

FIG. 5B illustrates an example GUI 511 for configuring an interaction page that corresponds to a task to be handled with an agent. Note that this interaction page is an interaction page generated by the application configuration system 178, and may include one or more default parameters for the content provider to input values. In addition, this template interaction page may also include one or more default values that correspond to the one or more default parameters, where the content provider may edit the values accordingly. The "Billing" interaction page is identified by its page name 511a and/or page number 511b. The page name 511a and the page number 511b correspond to the name of the page shown in the Page Name field 501d and the number of the page shown in the Page # field 501e respectively, shown in the Site Overview page 501.

The comments text box 511d allows the content provider to enter comments about the interaction page to be previewed on the Site Overview page 501. The main tab 511e of the interaction page allows the content provider to enter parameters that configure the agent information of the interaction page. The message specified in the "Initial Prompts" parameter 511c is delivered to the user, which can be edited by the user of the content provider system 142. The GUI 511 shows a table 513 summarizing the agents for this task. Referring back to FIGS. 2E and 2F, the table 513 includes only the agents having "Billing" as a skill, as specified by the user of the content provider system 142 using the contact center builder 170. The user of the content provider system 142 may edit and/or delete agents by clicking on the corresponding pencil and/or the garbage can symbols in the column 513*a*. The edits for the agent information performed in the application builder 190 may be updated in the contact center configuration data store 162.

FIG. 5C illustrates an example GUI 521 for configuring an interaction page that corresponds to a task to be handled by an IVR system 152 without using an agent. Note that this interaction page is an interaction page generated by the application configuration system 178, and may include one or more default parameters for the content provider to input values. In addition, this template interaction page may also include one or more default values that correspond to the one or more default parameters, where the content provider may edit the values accordingly. The "Survey" interaction page is identified by its page name 521*a* and/or page number 521*b*.

The main tab 521*e* of the interaction page allows the content provider to enter parameters that configure the interaction page for the IVR channel. The "Response Type" parameter 522 allows the content provider to specify what type of response the multi-channel communications system 135 may expect the user to provide after the message specified in the "Initial Prompts" parameter 521*c* is delivered to the user, which allows the content provider to customize the resources to be used to process the received response. Here, the default initial prompt expects a YES/NO answer, and the default "Response Type" parameter 522 is set to "Keyword" accordingly. In some implementations, the received information may be stored in a variable "Variable 1" as specified by default in the "Store in Variable" drop-down menu, where the variable may be selected from a list of variables previously specified by the content provider. The variable stores the keyword provided by the user and processed by the multi-channel communications system 135. In some implementations, the value of the variable may be stored in the data store 160.

Fields 523*a* and 523*b* correspond to default keywords that the content provider may expect a user to say, after providing the user with the initial prompt. In the field 523*a*, the default value is the keyword "Yes." Alternatively, the user may also press the number pad "1" on the communications device 110 to send a "Yes" response. By default, in the event that the user has responded with the keyword "Yes," a value of "1" will be assigned to "Variable 1," and the next destination 529*a* interaction page presented to the user will be "End call," which corresponds to page # "8000," as indicated in the Page # field 501*e* shown in the Site Overview page 501.

Similarly, in the field 523*b*, the default value is the keyword "No." Alternatively, the user may also press the number pad "2" on the communications device 110 to send a "No" response. By default, in the event that the user has responded with the keyword "No," the value "2" will be assigned to "Variable 1," and the next destination 529*b* interaction page presented to the user will be "End Call," which corresponds to page # "8000," as indicated in the Page # field 401*e* shown in the Site Overview page 501. Lastly, by default, the field 523*c* is shown as having no default value.

In some implementations, the user of the content provider system 142 may revise the survey interaction page generated by the application configuration system 178 of the contact center builder 170 to tailor to the business need of the user of the content provider system 142. In some implementations, the revision for the interaction page may be updated in the interaction flow document store 185 after the user of the content provider system 142 re-compiles the interaction site using the application compiler 194 of the application builder 190.

Figure 6:
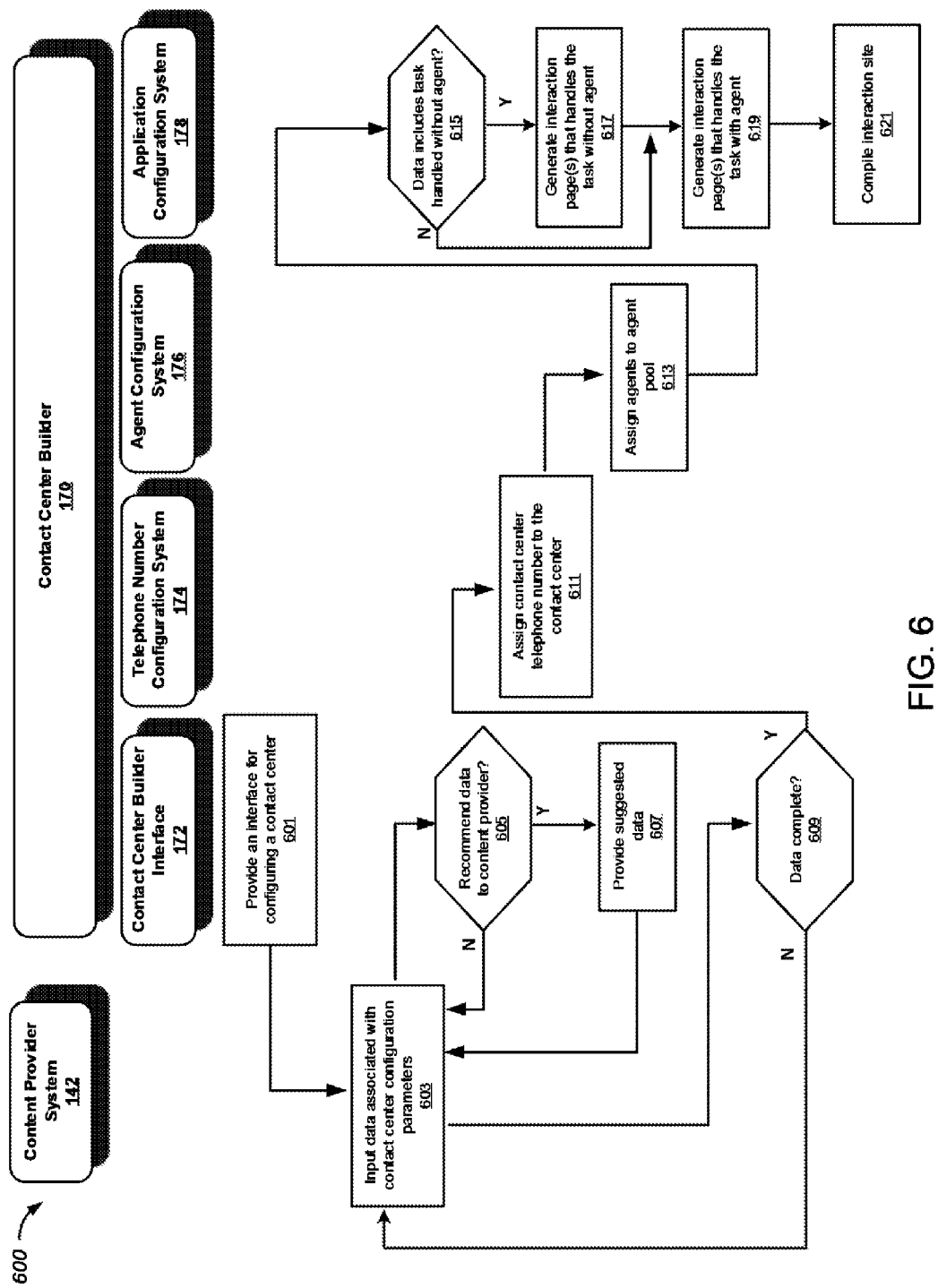
FIG. 6 is a flow chart illustrating an example of a process for a content provider to create a contact center having an interaction site.

FIG. 6 is a flow chart illustrating an example of a process 600 for a content provider to create a contact center having an interaction site. In general, the process 600 provides a content provider an interface for creating a call center, and for creating an interaction site that may be accessed in a multi-channel solution platform. The process 600 is described as being performed by a computer system comprising one or more computers, for example, the communications system 100 shown in FIG. 1.

Referring to FIG. 6, the contact center builder interface 172 provides to the content provider system 142 an interface for configuring a contact center (601). For example, the contact center builder interface 172 may provide a GUI similar to the GUIs 201-208 that can be used to build a call center. The content provider system 142 inputs data associated with contact center configuration parameters (603). For example, the GUI 202 may prompt the content provider system 142 to input data corresponding to the company information.

The contact center builder interface 172 determines whether data is to be recommended to the content provider system 142 (605). For example, referring to FIGS. 3A and 3B, the contact center builder 170 may determine one or more tasks to be recommended to the content provider system 142 based on contact center configuration data of other contact centers. As another example, referring to FIGS. 4A and 4B, the contact center builder 170 may determine one or more tasks to be recommended to the content provider system 142 based on customer data of the content provider.

If the contact center builder interface 172 determines that data is to be recommended to the content provider system 142, the contact center builder interface 172 provides the recommended data to the content provider system 142 (607). For example, referring to FIG. 3B, the contact center builder interface 172 may recommend tasks 333*b*-333*e* to be performed with an agent, and tasks 335*b*-335*d* to be performed without an agent to the content provider system 142.

The contact center builder interface 172 determines whether data is complete (609). For example, the content provider system 142 may continue to input data for the contact center set up process until clicking the "Complete" button 257 in FIG. 2G. If the contact center builder interface 172 determines that data is not complete, the content provider system 142 continues to input data associated with contact center configuration parameters (603). If the contact center builder interface 172 determines that data is complete, the telephone number configuration system 174 assigns a contact center telephone number to the contact center (611). For example, using the input data specified in GUI 201 in FIG. 2A, the telephone number configuration system 174 may store the assigned telephone number of the contact center as contact center configuration data in the contact center configuration data store 162.

The agent configuration system 176 assigns agents to an agent pool of the contact center (613). For example, using the input data specified in GUIs 204-206 in FIGS. 2D-2F, the agent configuration system 176 may aggregate and manipulate the agent information, and store the agent information as contact center configuration data in the contact center configuration data store 162.

The application configuration system 178 determines whether the data includes one or more tasks to be handled without an agent (615). For example, using the input data specified in GUI 203 in FIG. 2C, the application configuration system 178 may determine whether the content provider system 176 has specified that one or more tasks are to be handled without an agent. If the application configuration system 178 determines that the data includes one or more tasks to be handled without an agent, the application configuration system 178 generates one or more interaction pages configured to handle the one or more tasks without an agent (617). For example, referring to FIG. 5A, the application configuration system 178 generates the interaction page 508a based on the input of the content provider system 142.

The application configuration system 178 generates one or more interaction pages configured to handle one or more tasks to be handled with an agent (619). For example, referring to FIG. 5A, the application configuration system 178 generates the interaction pages 507a-507d based on the input of the content provider system 142. The application configuration system 178 compiles an interaction site including the one or more interaction pages configured to handle the one or more tasks without an agent and the one or more interaction pages configured to handle one or more tasks to be handled with an agent (621). For example, the application configuration system 178 of the contact center builder 170 may access the application compiler 194 of the application builder 190 to compile an interaction site that includes an interactive flow as specified by the interaction pages in FIG. 5A.

Figure 7:
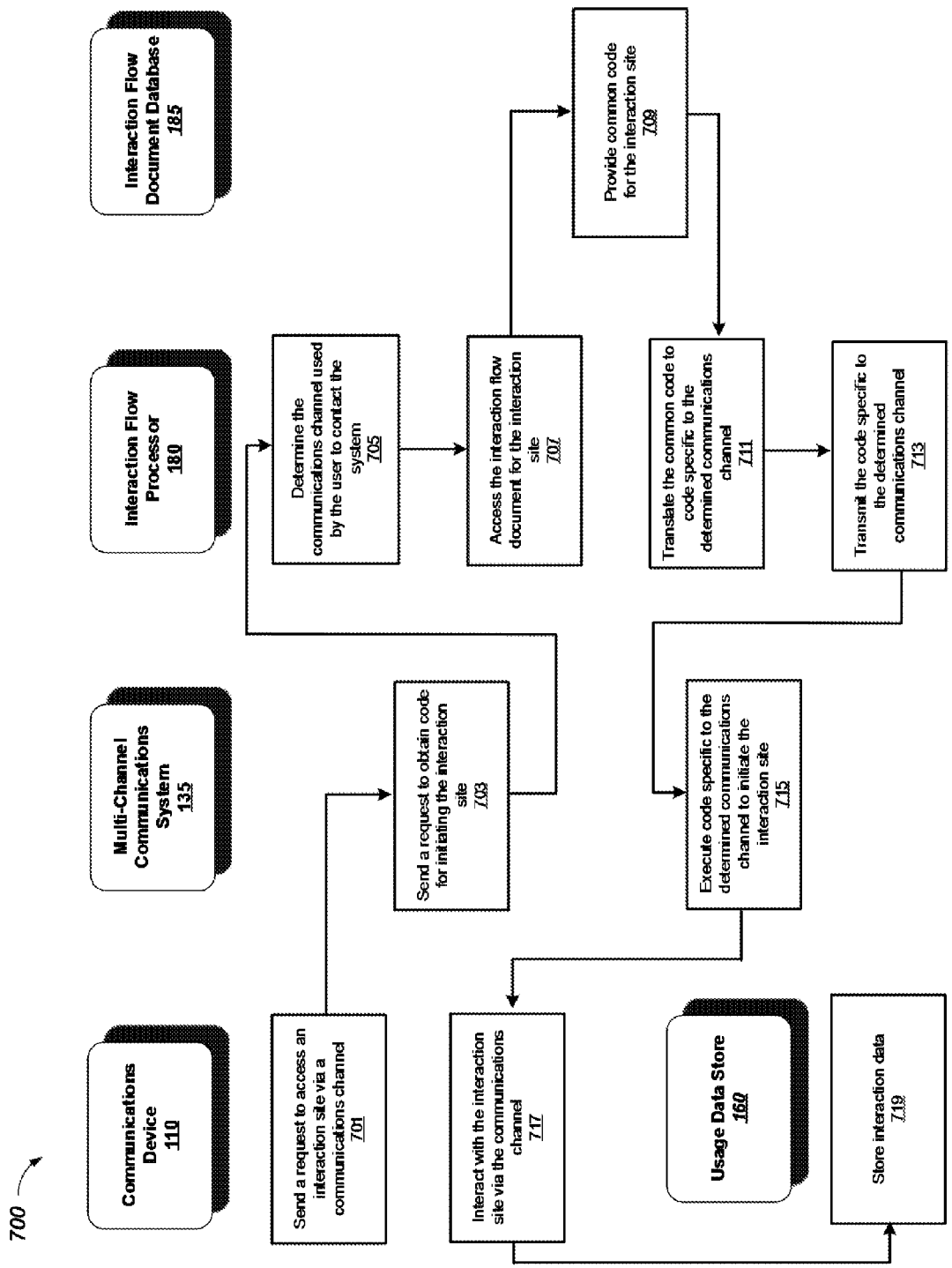
FIG. 7 is a flow chart illustrating an example of a process for a user to communicate with a multi-channel communications system and access an interaction site via a communications channel.

FIG. 7 is a flow chart illustrating an example of a process 700 for a user to communicate with a multi-channel communications system and access an interaction site via a communications channel. In general, the process 700 provides a communications device access to an interaction site using a communications channel of a user's choice. The process 700 is described as being performed by a computer system comprising one or more computers, for example, the communications system 100 shown in FIG. 1.

The communications device 110 sends a request to access an interaction site via a particular communications channel (701). A user of the communications device (e.g., a smart phone) 110 is able to interact with the communications device 110 to request a service from an interaction site that is provided by a content provider using a communications channel. For example, the user may indicate a desire to request a service by contacting the multi-channel communications system 135 in any of multiple different ways. For example, the user may call a telephone number, send an SMS message, enter into a chat session, or send an email.

The multi-channel communications system 135 receives the request from communications device 110, and sends a request to the interaction flow processor 180 to obtain code for initiating the interaction site (703). Depending on the communications channel the communications device 110 is using, the request is received by a handling system in the multi-channel communications system 135. For example, if the user of the communications device 110 calls a phone number to reach the interaction site, the call handling system 150 will receive the phone call. Based on the contact information received by the multi-channel communications system 135, the corresponding handling system sends a request to the interaction flow processor 180 for the scripts for executing the interaction site. The request sent by the multi-channel communications system 135 to the interaction flow processor 180 may include an interaction site identifier (e.g., a unique interaction site identifier) that may be used by the interaction flow processor 180 to identify the desired interaction site. In some implementations, the multi-channel communications system 135 may send a request for the scripts for executing the entire flow of the interaction site. In other implementations, the multi-channel communications system 135 may send a request for the scripts for executing a particular state of the flow (e.g., a state corresponding to executing a single page or executing a subset of the pages of the interaction site), rather than the entire flow.

The interaction flow processor 180 identifies the communications channel used by the user to contact the system (705). In some implementations, the communications channel may be included in the request sent by the multi-channel communications system 135. In some implementations, the communications channel may be determined by the interaction flow processor 180 based on the identifier of the handling system. For example, the identifier may be an IP address of the handling system. As another example, the identifier may be metadata embedded in the request to the interaction flow processor 180.

The interaction flow processor 180 accesses the interaction flow document for the interaction site (707). Based on the interaction site that the multi-channel communications system 135 has requested, the interaction flow processor 180 accesses the interaction flow document stored in the interaction flow document database 185. The interaction flow document database 185 then provides the common code for the interaction site (709). In some implementations, the common code may be XML scripts.

The interaction flow processor 180 translates the common code to code specific to the determined communications channel (711). Based on the communications channel that the communications device 110 is using, the interaction flow processor 180 translates the scripts in the interaction flow document to a specific language that the handling system can execute. For example, if the handling system is the call handling system 150, the interaction flow processor 180 translates the scripts from XML scripts to VoiceXML scripts. In some implementations, the translation may include adding parameters specific to a type of communications channel in the translated scripts. For example, if the handling system is the call handling system 150, the interaction flow processor 180 may add information specific to ASR resource selection in the translated scripts. The interaction flow processor 180 then transmits the translated code that is specific to the determined communications channel to the multi-channel communications system 135 (713).

The multi-channel communications system 135 executes code specific to the determined communications channel to initiate the interaction site between the multi-channel communications system 135 and the communications device 110 (715). The communications device 110 then interacts with the interaction site via the communications channel (717). As described above, the interaction site may include one or more interaction pages configured to handle user requests using a human agent. The interaction site may also include one or more interaction pages configured to handle user requests using an IVR channel without a human agent. Notably, if the interaction site is an enhanced interaction site (i.e., a site that includes one or more multimodal action pages), the communication device 110 may interact with the interaction site via the standard communications mode (e.g., text) of the communications channel (e.g., chat) and, in at least some portions of the interaction flow, via one or more additional communication modes (e.g., video and audio). As stated previously, multimodal action pages are described in greater detail in application Ser. No. 13/092,090, which is incorporated herein by reference for all purposes.

The communications device 110 transmits interaction data to the data store 160, and the data store 160 stores the interaction data (719). In some implementations, the recommendation engine 196 may access the interaction data to recommend artifacts to content providers. For example, the recommendation engine 196 may only recommend interaction sites that satisfy a certain call drop threshold. As another example, the recommendation engine 196 may only recommend interaction sites that satisfy a certain customer satisfaction threshold. As another example, the recommendation engine 196 may only recommend interaction sites that have been accessed by a threshold number of callers.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

An "engine" (or "software engine") may refer to a software implemented input/output system that provides an output that is different from the input. An engine can be an encoded block of functionality, such as a library, a platform, a Software Development Kit ("SDK"), a software module, or an object.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method, comprising:

transmitting, from a contact center builder system to a content provider system of a content provider, instructions that, when executed, provide a graphic user interface for configuring a contact center for the content provider that includes a contact center telephone number, an agent pool, and an interaction site, the interaction site enabling communications between a user device and a communications system over any of multiple communications channels, including an interactive voice response (IVR) channel, wherein the interaction site specifies a multi-step communication flow between the user device and the communications system, and wherein the multi-step communication flow is determined based on multiple interaction pages configurable by a developer of the content provider system;

receiving, at the contact center builder system and from the content provider system, data associated with one or more configuration parameters of the contact center;

assigning the contact center telephone number to the contact center based on the data;

assigning one or more agents to the agent pool of the contact center based on the data;

determining that the data includes a task to be handled by the communications system without using an agent from among the one or more agents of the agent pool; and in response to determining that the data includes the task to be handled by the communications system without using the agent of the agent pool, generating multiple interaction pages for the interaction site, wherein at least one interaction page of the multiple interaction pages enables a first caller to communicate with the communications system to reach the agent of the agent pool, and wherein at least one other interaction page of the multiple interaction pages enables a second caller to communicate with the communications system to complete the task using the IVR channel without using the agent of the agent pool.

2. The method of claim 1, wherein assigning the contact center telephone number to the contact center comprises:

selecting, from among multiple telephone numbers provided by multiple telephone carriers, one or more candidate telephone numbers;

transmitting, from the contact center builder system to the content provider system, instructions that, when executed, provide a graphic user interface for selecting one of the one or more candidate telephone numbers;

receiving, at the contact center builder system and from the content provider system, data representing a selection of a particular telephone number of the one or more candidate telephone numbers; and in response to receiving the data representing the selection of the particular telephone number, assigning the particular telephone number to the contact center as the contact center telephone number.

3. The method of claim 1, wherein assigning one or more agents to the agent pool comprises:

transmitting, from the contact center builder system to the content provider system, instructions that, when executed, provide a graphic user interface for configuring the agent pool;

receiving, at the contact center builder system and from the content provider system, data corresponding to a configuration of the one or more agents and one or more respective skills associated with each agent; and in response to receiving the data corresponding to the configuration of the one or more agents and the one or more respective skills associated with each agent, assigning the one or more agents and the one or more respective skills associated with each agent to the agent pool.

4. The method of claim 1, wherein generating multiple interaction pages for the interaction site comprises:

determining that an interaction page of another interaction site is configured to handle the task without an agent; and in response to determining that the interaction page of another interaction site is configured to handle the task without an agent, generating an interaction page configured to handle the task without an agent based on the interaction page of another interaction site.

5. The method of claim 1, further comprising:

identifying an attribute of the content provider based on the data; and determining that one or more other content providers share the attribute.

6. The method of claim 5, further comprising:

in response to determining that one or more other content providers share the attribute, identifying one or more tasks handled by one or more other contact centers of the one or more other content providers; and presenting the one or more tasks to the content provider system.

7. The method of claim 5, wherein the attribute includes a name of the content provider, an industry of the content provider, or a task performed by the content provider.

8. The method of claim 5, wherein identifying the attribute of the content provider comprises inferring the attribute of the content provider based on the data.

9. The method of claim 1, comprising:

receiving interaction data representing historical user interactions;

extracting one or more tasks using the interaction data; and presenting the one or more.tasks:to the content provider system.

10. The method of claim 9, wherein extracting one or more tasks using the interaction data comprises:

generating fragments of the interaction data;

grouping the fragments of the interaction data into one or more clusters; and classifying each of the one or more clusters with a respective task.

11. The method of claim 9, wherein the interaction data includes speech data or text data transcribed from the speech data.

12. The method of claim 1, further comprising generating an interaction flow document, the interaction flow document including code for the interaction site specifying the multi-step communication flow.

13. The method of claim 12, wherein the code of the interaction flow document includes XML scripts that correspond to the interaction pages of the interaction site.

14. The method of claim 1, wherein the multiple communications channels further include at least one of a SMS channel, a chat channel, and an email channel.

15. A computer-implemented system comprising:

one or more processors and one or more non-transitory computer-readable storage devices storing instructions that when executed by the one or more processors cause the one or more processors to perform operations comprising:

transmitting, to a content provider system of a content provider, instructions that, when executed, provide a graphic user interface for configuring a contact center for the content provider that includes a contact center telephone number, an agent pool, and an interaction site, the interaction site enabling communications between a user device and a communications system over any of multiple communications channels, including an interactive voice response (IVR) channel, wherein the interaction site specifies a multi-step communication flow between the user device and the communications system, and wherein the multi-step communication flow is determined based on multiple interaction pages configurable by a developer of the content provider system;

receiving, from the content provider system, data associated with one or more configuration parameters of the contact center;

assigning the contact center telephone number to the contact center based on the data;

assigning one or more agents to the agent pool of the contact center based on the data;

determining that the data includes a task to be handled by the communications system without using an agent from among the one or more agents of the agent pool; and in response to determining that the data includes the task to be handled by the communications system without using the agent of the agent pool, generating multiple interaction pages for the interaction site, wherein at least one interaction page of the multiple interaction pages enables a first caller to communicate with the communications system to reach the agent of the agent pool, and wherein at least one other interaction page of the multiple interaction pages enables a second caller to communicate with the communications system to complete the task using the IVR channel without using the agent of the agent pool.

16. The system of claim 15, wherein assigning the contact center telephone number to the contact center comprises:

selecting, from among multiple telephone numbers provided by multiple telephone carriers, one or more candidate telephone numbers;

transmitting, to the content provider system, instructions that, when executed, provide a graphic user interface for selecting one of the one or more candidate telephone numbers;

receiving, from the content provider system, data representing a selection of a particular telephone number of the one or more candidate telephone numbers; and in response to receiving the data representing the selection of the particular telephone number, assigning the particular telephone number to the contact center as the contact center telephone number.

17. The system of claim 15, wherein assigning one or more agents to the agent pool comprises:

transmitting, to the content provider system, instructions that, when executed, provide a graphic user interface for configuring the agent pool;

receiving, from the content provider system, data corresponding to a configuration of the one or more agents and one or more respective skills associated with each agent; and in response to receiving the data corresponding to the configuration of the one or more agents and the one or more respective skills associated with each agent, assigning the one or more agents and the one or more respective skills associated. with each agent to the agent pool.

18. A contact center builder computing system comprising:

a contact center builder interface configured to:
transmit, to a content provider system of a content provider, instructions that, when executed, provide a graphic user interface for configuring a contact center for the content provider that includes a contact center telephone number, an agent pool, and an interaction site, the interaction site enabling communications between a user device and a communications system over any of multiple communications channels, including an interactive voice response (IVR) channel, wherein the interaction site specifies a multi-step communication flow between the user device and the communications system, and wherein the multi-step communication flow is determined based on multiple interaction pages configurable by a developer of the content provider system; and
receive, from the content provider system, data associated with one or more configuration parameters of the contact center;

a telephone number configuration system configured to assign the contact center telephone number to the contact center-based on the data;

an agent configuration system configured to assign one or more agents to the agent pool of the contact center based on the data; and an application configuration system including at least one processor configured to:
determine that the data includes a task to be handled by the communications system without using an agent from among the one or more agents of the agent pool; and
in response to determining that the data includes the task to be handled by the communications system without using the agent of the agent pool, generate multiple interaction pages for the interaction site, wherein at least one interaction page of the multiple interaction pages enables a first caller to communicate with the communications system to reach the agent of the agent pool, and wherein at least one other interaction page of the multiple interaction pages enables a second caller to communicate with the communications system to complete the task using the IVR channel without using the agent of the agent pool.

19. The contact center builder system of claim 18, wherein assigning the contact center telephone number to the contact center comprises:

selecting, from among multiple telephone numbers provided by multiple telephone carriers, one or more candidate telephone numbers;

transmitting, to the content provider system, instructions that, when executed, provide a graphic user interface for selecting one of the one or more candidate telephone numbers;

receiving, from the content provider system, data representing a selection of a particular telephone number of the one or more candidate telephone numbers; and in response to receiving the data representing the selection of the particular telephone number, assigning the particular telephone number to the contact center as the contact center telephone number.

20. The contact center builder system of claim 18, wherein assigning one or more agents to the agent pool comprises:
- transmitting, to the content provider system, instructions that, when executed, provide a graphic user interface for configuring the agent pool;
- receiving, from the content provider system, data corresponding to a configuration of the one or more agents and one or more respective skills associated with each agent; and
- in response to receiving the data corresponding to the configuration of the one or more agents and the one or more respective skills associated with each agent, assigning the one or more agents and the one or more respective skills associated with each agent to the agent pool.

* * * * *